(12) United States Patent
Hayashigawa et al.

(10) Patent No.: US 9,308,825 B2
(45) Date of Patent: Apr. 12, 2016

(54) ELECTRIC VEHICLE DOCKING CONNECTOR WITH EMBEDDED EVSE CONTROLLER

(75) Inventors: Larry Hayashigawa, Downey, CA (US); Albert Joseph Flack, Lake Arrowhead, CA (US); Herman Joseph Steinbuchel, IV, Pasadena, CA (US); David Paul Soden, Mission Viejo, CA (US); Scott Berman, Los Angeles, CA (US); Ronald Lee Norton, Monrovia, CA (US); Michael Thomas Zevin, Valencia, CA (US); Michael Bissonette, Laguna Hills, CA (US)

(73) Assignee: AeroVironment, Inc., Simi Valley, CA (US)

( * ) Notice: Subject to any disclaimer, the term of this patent is extended or adjusted under 35 U.S.C. 154(b) by 0 days.

(21) Appl. No.: 13/980,854

(22) PCT Filed: Jan. 18, 2012

(86) PCT No.: PCT/US2012/021751
§ 371 (c)(1),
(2), (4) Date: Oct. 4, 2013

(87) PCT Pub. No.: WO2012/099978
PCT Pub. Date: Jul. 26, 2012

(65) Prior Publication Data
US 2014/0035527 A1    Feb. 6, 2014

Related U.S. Application Data

(63) Continuation-in-part of application No. PCT/US2011/031843, filed on Apr. 8, 2011.

(60) Provisional application No. 61/434,282, filed on Jan. 19, 2011, provisional application No. 61/437,001,
(Continued)

(51) Int. Cl.
*H01M 10/44* (2006.01)
*H01M 10/46* (2006.01)
(Continued)

(52) U.S. Cl.
CPC ........... *B60L 11/1818* (2013.01); *B60L 3/0023* (2013.01); *B60L 3/04* (2013.01); *B60L 11/1846* (2013.01); *B60L 11/1861* (2013.01);
(Continued)

(58) Field of Classification Search
CPC ..... H02J 7/0029; H02J 7/0026; H02J 7/0042; H02J 7/355
USPC ......... 320/104, 109, 150, 136, 139, 141, 152, 320/155, 157, 159, 162
See application file for complete search history.

(56) References Cited

U.S. PATENT DOCUMENTS 4,193,655 A * 3/1980 Herrmann, Jr. ............... 439/166
5,627,448 A * 5/1997 Okada et al. .................. 439/133
(Continued)

*Primary Examiner* — Edward Tso
(74) *Attorney, Agent, or Firm* — Christopher R. Balzan; Eric J. Aagaard

(57) ABSTRACT

A portable electric vehicle supply equipment (EVSE) kit or system includes a docking connector having a docking head engagable with the charging port of an electric vehicle and a barrel or handle fixed to the docking head and having a barrel electrical connector. An EVSE controller is embedded within the docking connector. An electric power cable has a first connector for engaging the barrel electrical connector and a second connector at an opposite end of the cable for connection to an electrical utility receptacle. The embedded EVSE controller enables the docking connector to function as an EVSE unit.

20 Claims, 32 Drawing Sheets

Related U.S. Application Data filed on Jan. 27, 2011, provisional application No. 61/467,068, filed on Mar. 24, 2011, provisional application No. 61/550,849, filed on Oct. 24, 2011, provisional application No. 61/567,018, filed on Dec. 5, 2011.

(51) Int. Cl.
| | | |
|---|---|---|
| *B60L 11/18* | (2006.01) | |
| *H02J 7/00* | (2006.01) | |
| *B60L 3/00* | (2006.01) | |
| *B60L 3/04* | (2006.01) | |

(52) U.S. Cl.
CPC ........... *H02J7/0029* (2013.01); *B60L 2230/12* (2013.01); *B60L 2230/16* (2013.01); *B60L 2240/36* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2250/16* (2013.01); *Y02T 10/7005* (2013.01); *Y02T 10/7088* (2013.01); *Y02T 90/121* (2013.01); *Y02T 90/14* (2013.01)

(56) References Cited

U.S. PATENT DOCUMENTS

2010/0174667 A1* 7/2010 Vitale et al. .................. 705/412
2010/0238020 A1* 9/2010 Pellen ........................... 340/533

* cited by examiner

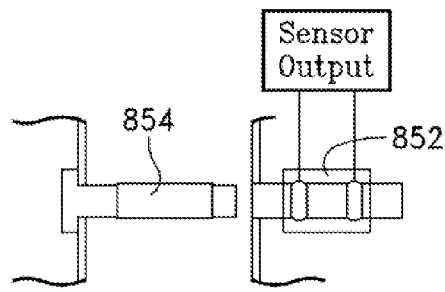 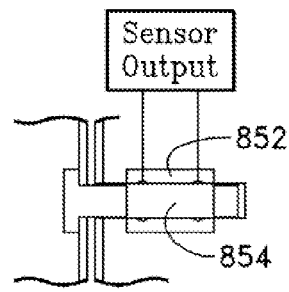
FIG. 24A          FIG. 24B
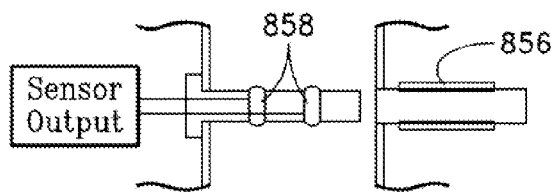 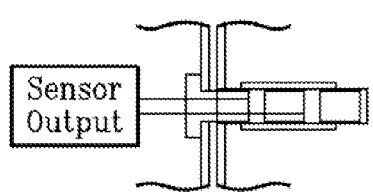
FIG. 25A          FIG. 25B
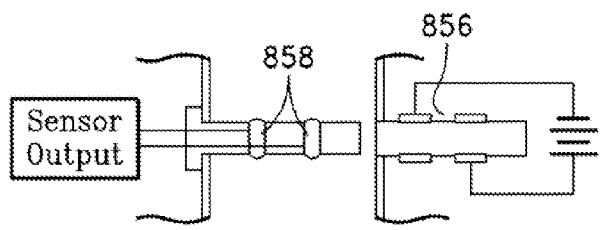 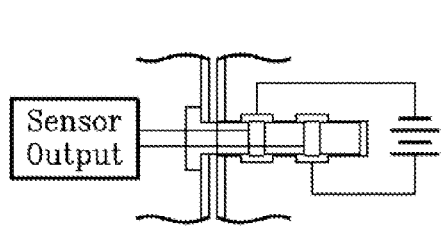
FIG. 26A          FIG. 26B
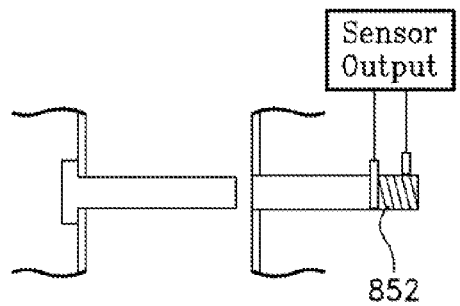 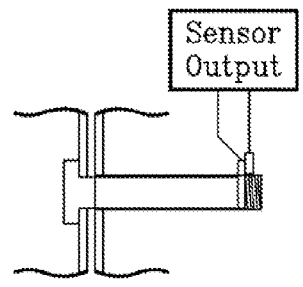
FIG. 27A          FIG. 27B

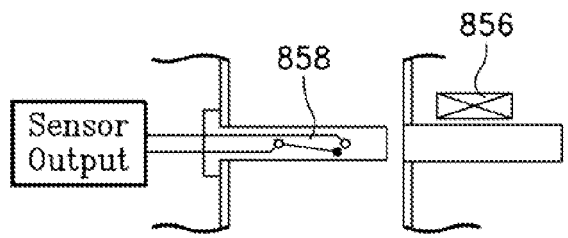 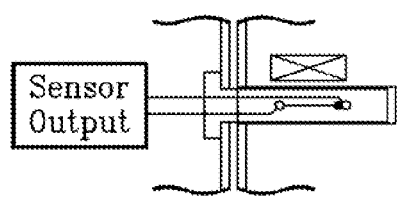
FIG. 28A　　　　　　　FIG. 28B
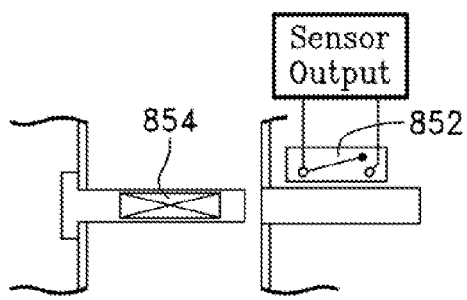 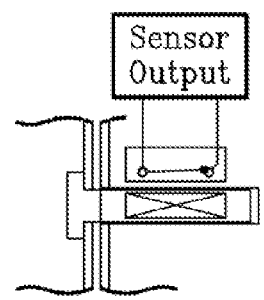
FIG. 29A　　　　　　　FIG. 29B
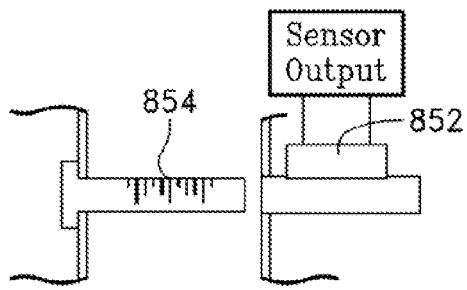 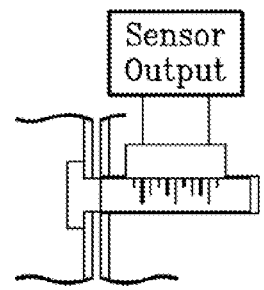
FIG. 30A　　　　　　　FIG. 30B
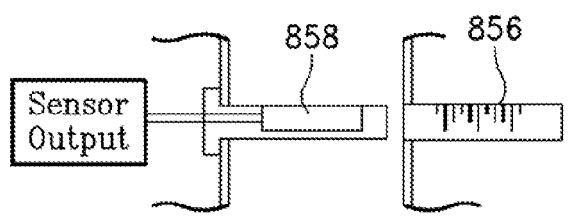 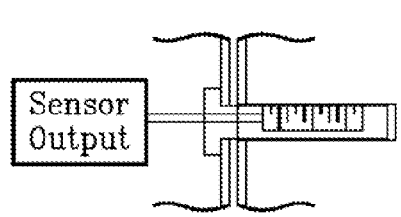
FIG. 31A　　　　　　　FIG. 31B

ELECTRIC VEHICLE DOCKING CONNECTOR WITH EMBEDDED EVSE CONTROLLER

CROSS REFERENCE TO RELATED APPLICATIONS

This application claims benefit of: U.S. Provisional Application Ser. No. 61/434,282 filed Jan. 19, 2011, entitled LEVEL 1-2 PORTABLE EV CHARGER CABLE, by David Paul Soden, et al.; U.S. Provisional Application Ser. No. 61/437,001 filed Jan. 27, 2011 entitled PORTABLE ELECTRIC VEHICLE CHARGING CABLE WITH IN-LINE CONTROLLER, by David Paul Soden, et al.; U.S. Provisional Application Ser. No. 61/467,068 filed Mar. 24, 2011, entitled PORTABLE CHARGING CABLE WITH IN-LINE CONTROLLER, by David Paul Soden, et al.; Of U.S. Provisional Application Ser. No. 61/550,849 filed Oct. 24, 2011 entitled ELECTRIC VEHICLE DOCKING CONNECTOR WITH EMBEDDED IN-LINE CONTROLLER, by David Paul Soden, et al; and U.S. Provisional Application Ser. No. 61/567,018 filed Dec. 5, 2011 entitled ELECTRIC VEHICLE DOCKING CONNECTOR WITH EMBEDDED EVSE CONTROLLER, by Larry Hayashigawa, et al. All of the above applications are hereby incorporated by reference in their entirety.

This application is a continuation-in-part of PCT Application Ser. No. PCT/US2011/031843 filed Apr. 8, 2011 entitled PORTABLE CHARGING CABLE WITH IN-LINE CONTROLLER, by David Paul Soden, et al., hereby incorporated by reference in its entirety.

TECHNICAL FIELD

The invention concerns electrical supply equipment such as charging devices for electric vehicles.

BACKGROUND

Electric vehicle supply equipment (EVSE) for residential charging of an electric vehicle (EV) is implemented at present as stationary units connected to the electric utility grid through a household electric utility panel, and are not readily portable. The possibility of a loss of battery power when the EV is far from a commercial recharging station or personal home charging equipment is a problem that has not been solved.

SUMMARY OF THE INVENTION

An electric vehicle supply equipment (EVSE) kit is provided for charging an electric vehicle through a charging port of the electric vehicle. The EVSE kit includes a docking connector with an EVSE controller embedded inside the docking connector, and a power cable for connecting the docking connector to an AC power outlet.

The docking connector comprises a head having a head end engagable with the charging port of the electric vehicle, and a barrel having one end joined with said head, and a barrel electrical connector on an opposite end of said barrel, said docking connector further comprising a first plurality of conductors extending into said barrel from said barrel electrical connector and a second plurality of conductors extending into said head from said head end. The embedded EVSE controller inside the docking connector is connected between the first and second pluralities of conductors. The power cable included with the kit has a pair of cable ends, and a first cable connector at one of said cable ends, said first cable connector being engagable with said barrel electrical connector, and a second cable connector at the other one of the cable ends, the second cable connector being engagable with an AC electrical power outlet.

BRIEF DESCRIPTION OF THE DRAWINGS

So that the manner in which the exemplary embodiments of the present invention are attained and can be understood in detail, a more particular description of the invention, briefly summarized above, may be had by reference to the embodiments thereof which are illustrated in the appended drawings. It is to be appreciated that certain well known processes are not discussed herein in order to not obscure the invention.

FIGS. 24A and 24B depict a first embodiment of an electrical in-post and in-hole proximity-sensing sensor and exciter pair as unengaged (FIG. 24A) and fully engaged (FIG. 24B).

FIGS. 25A and 25B depict a second embodiment of an electrical in-post and in-hole proximity-sensing sensor and exciter pair as unengaged (FIG. 25A) and fully engaged (FIG. 25B).

FIGS. 26A and 26B depict a third embodiment of an electrical in-post and in-hole proximity-sensing sensor and exciter pair as unengaged (FIG. 26A) and fully engaged (FIG. 26B).

FIGS. 27A and 27B depict an in-hole proximity-sensing sensor as a mechanical position sensor as unengaged (FIG. 27A) and fully engaged (FIG. 27B).

FIGS. 28A and 28B depict a first embodiment of a magnetic in-post and in-hole proximity-sensing sensor and exciter pair as unengaged (FIG. 28A) and fully engaged (FIG. 28B).

FIGS. 29A and 29B depict a second embodiment of a magnetic in-post and in-hole proximity-sensing sensor and exciter pair as unengaged (FIG. 29A) and fully engaged (FIG. 29B).

FIGS. 30A and 30B depict a first embodiment of an optical in-post and in-hole proximity-sensing sensor and exciter pair as unengaged (FIG. 30A) and fully engaged (FIG. 30B).

FIGS. 31A and 31B depict a second embodiment of an optical in-post and in-hole proximity-sensing sensor and exciter pair as unengaged (FIG. 31A) and fully engaged (FIG. 31B).

Figure 1:
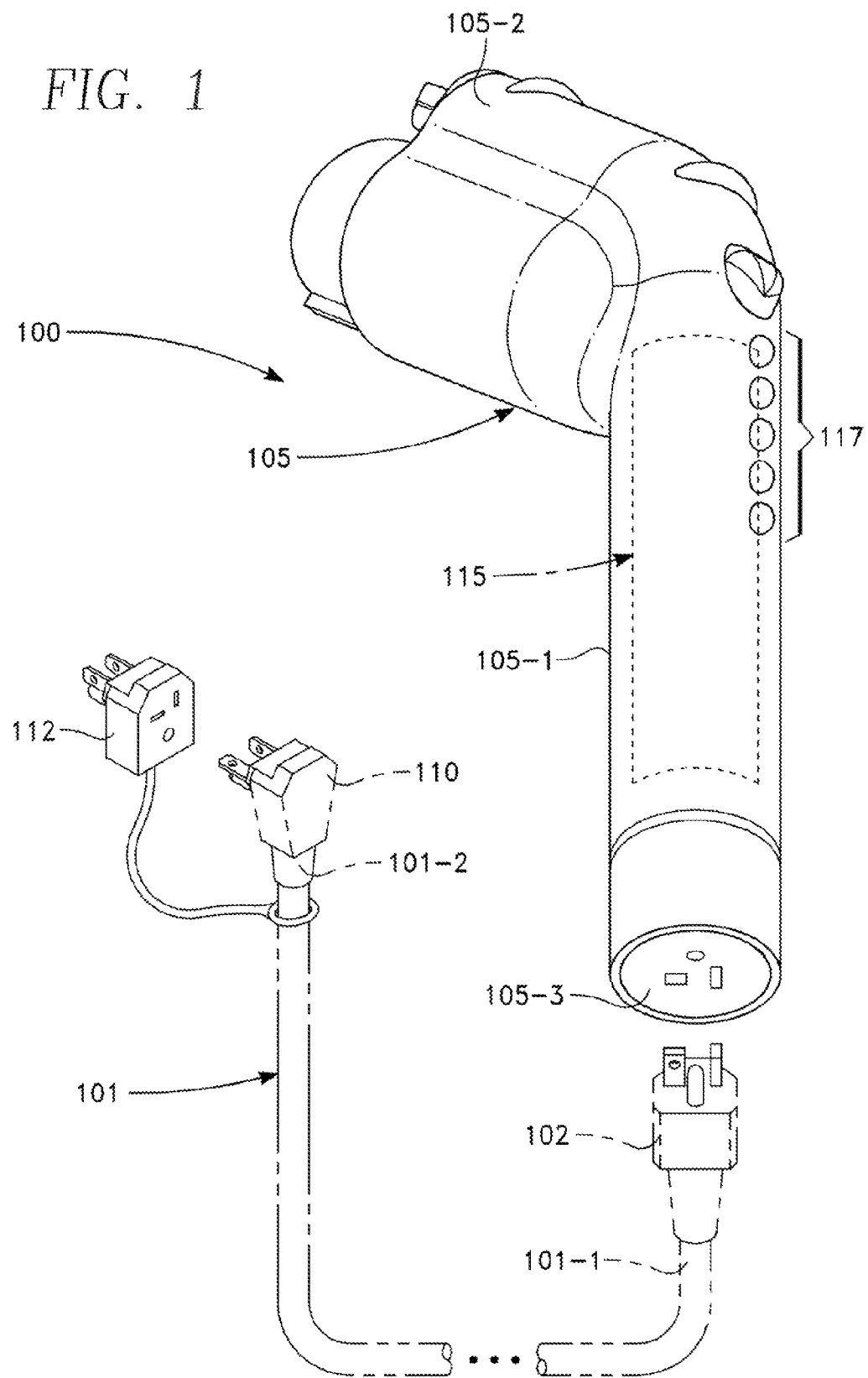
FIG. 1 illustrates an EVSE kit including an electric vehicle docking connector disconnectable from an electric power cable, the docking connector containing an embedded EVSE controller, enabling the docking connector to function as an EVSE unit.

To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION

Embodiments of the present invention facilitate charging an EV using commonly available electricity outlets with a light transportable EVSE unit. The light transportable EVSE unit can be easily carried in an EV and independently used at remote locations to charge the EV from standard electric power outlets. Electrical and electronic components required to perform the functions of an EVSE are integrated into an EVSE controller that is embedded in a docking connector for connection to the EV charging port, in one embodiment.

Referring to FIG. 1, an electric vehicle supply equipment (EVSE) docking connector 105 has an external enclosure defining an interior volume. An EVSE controller 115 is contained or embedded within the volume defined by the external enclosure of the docking connector 105, and therefore may be referred to as the embedded EVSE controller 115. The embedded EVSE controller 115 provides the docking connector 105 with the complete functionality of an EVSE unit. A charging cable 101 has a docking end 101-1 and a utility end 101-2. The exterior surface of the cable 101 is formed by a cylindrical flexible sleeve of an insulating material such as rubber or flexible plastic, for example. The cable 101 contains multiple insulated conductors described below. The docking end 101-1 of the charging cable 101 is directly connected to the docking connector 105 in a manner described below.

The docking connector 105 includes a barrel or handle 105-1 and a docking head 105-2 extending at an acute angle from the barrel 105-1 and engagable with the EV charging port 107. The docking head 105-2 has discrete conductor surfaces (not illustrated) disposed so as to make electrical contact with conductors in the EV charging port 107 upon insertion of the docking head 105-2 into the EV charging port 107. In the embodiment of FIG. 1, the embedded EVSE controller 115 is contained within the barrel 105-1. However, the embedded EVSE controller 115 may occupy a portion of both the barrel 105-1 and the head 105-2 or it may be located entirely within the head 105-2.

Figure 2:
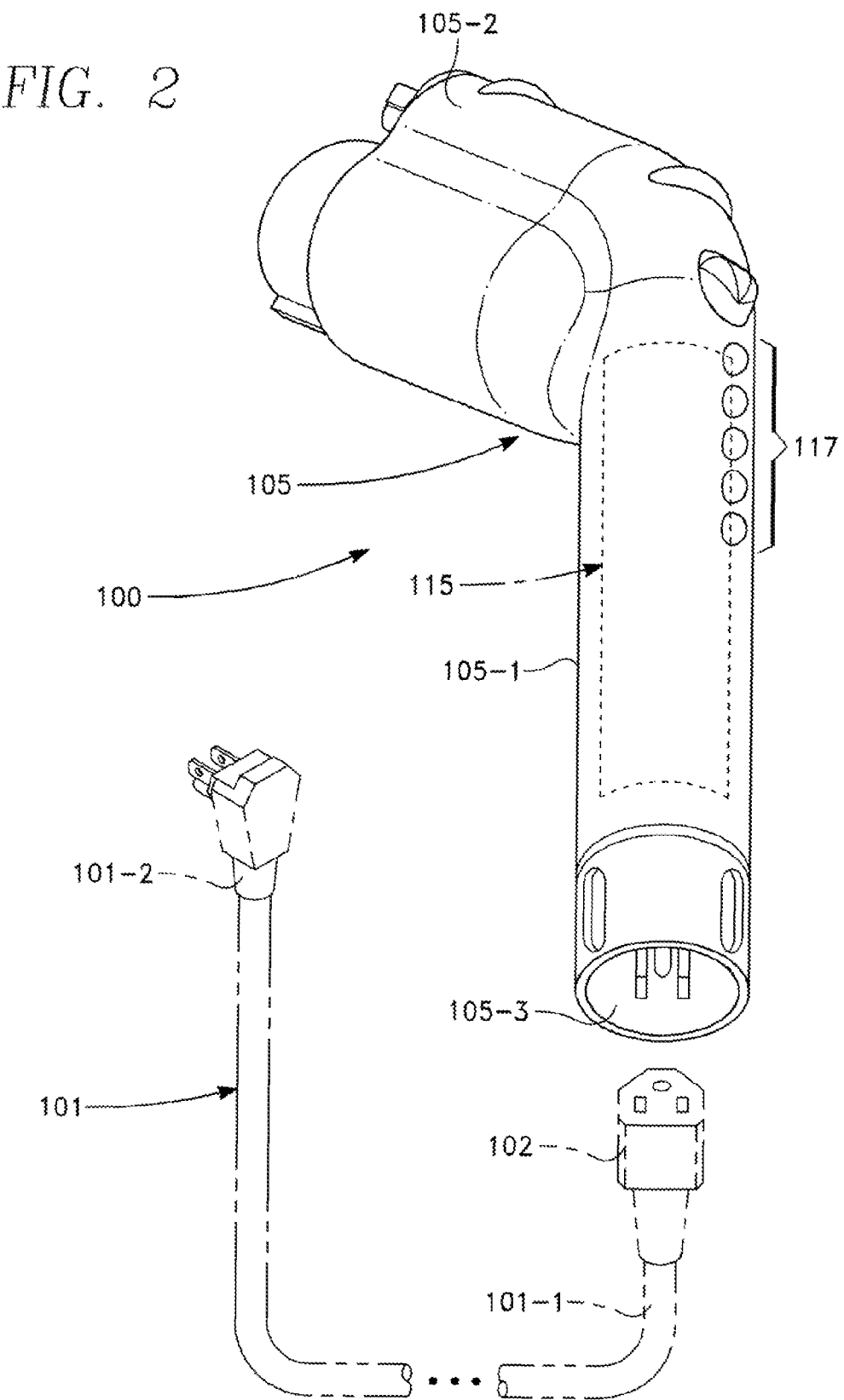
FIG. 2 illustrates a modification of the EVSE kit of FIG. 1.
Figure 3:
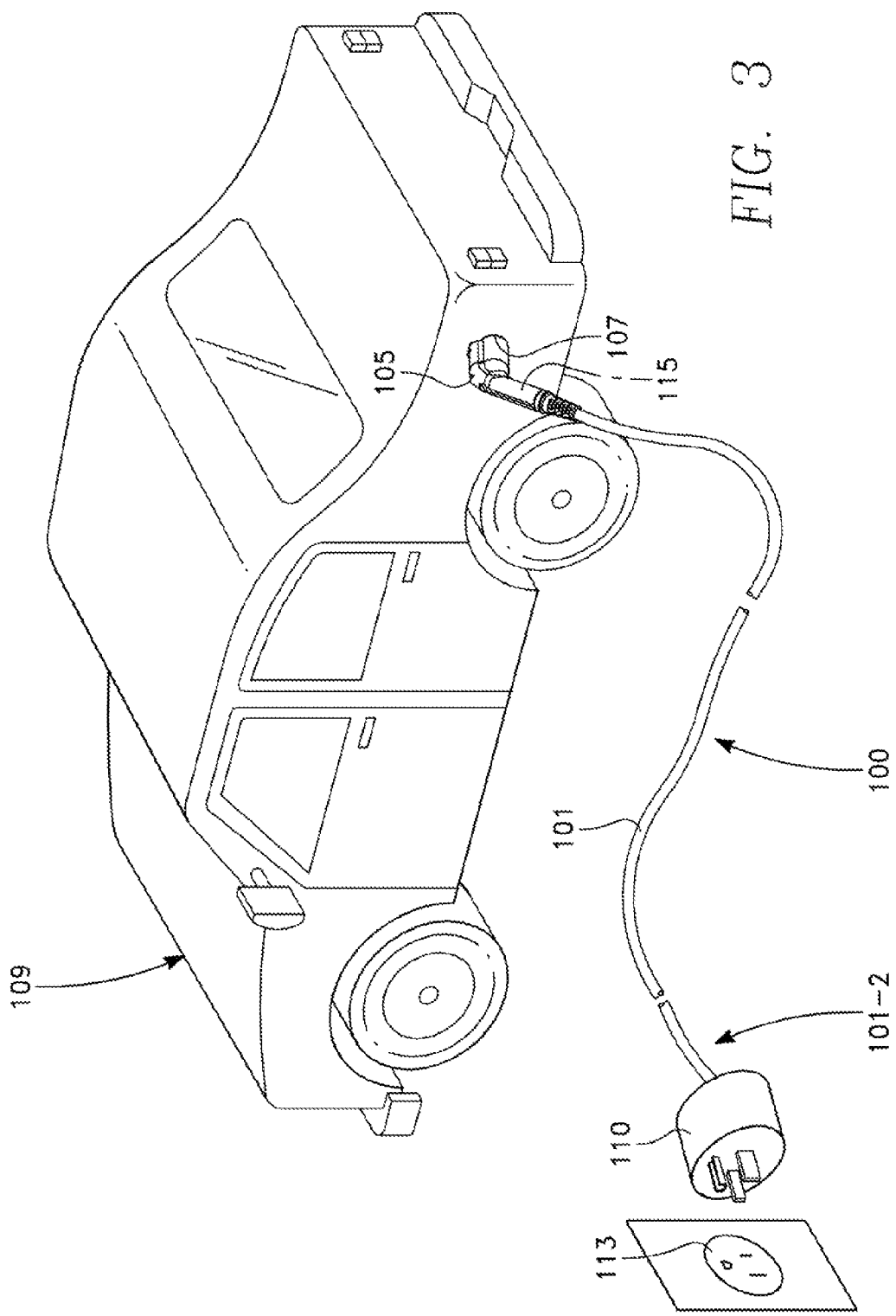
FIG. 3 depicts the EVSE kit of FIG. 1 or FIG. 2 connected between an electric vehicle and an AC power outlet.

The docking connector 105 is provided with a barrel electrical connector 105-3 on the end of the barrel 105-1 for furnishing electrical power to the embedded EVSE controller 115. In the embodiment of FIG. 1, the barrel electrical connector 105-3 is female. FIG. 2 depicts another embodiment of the docking connector 105 in which the barrel electrical connector 105-3 is male. FIG. 3 depicts the docking connector 105 charging an electric vehicle 109.

Figure 4:
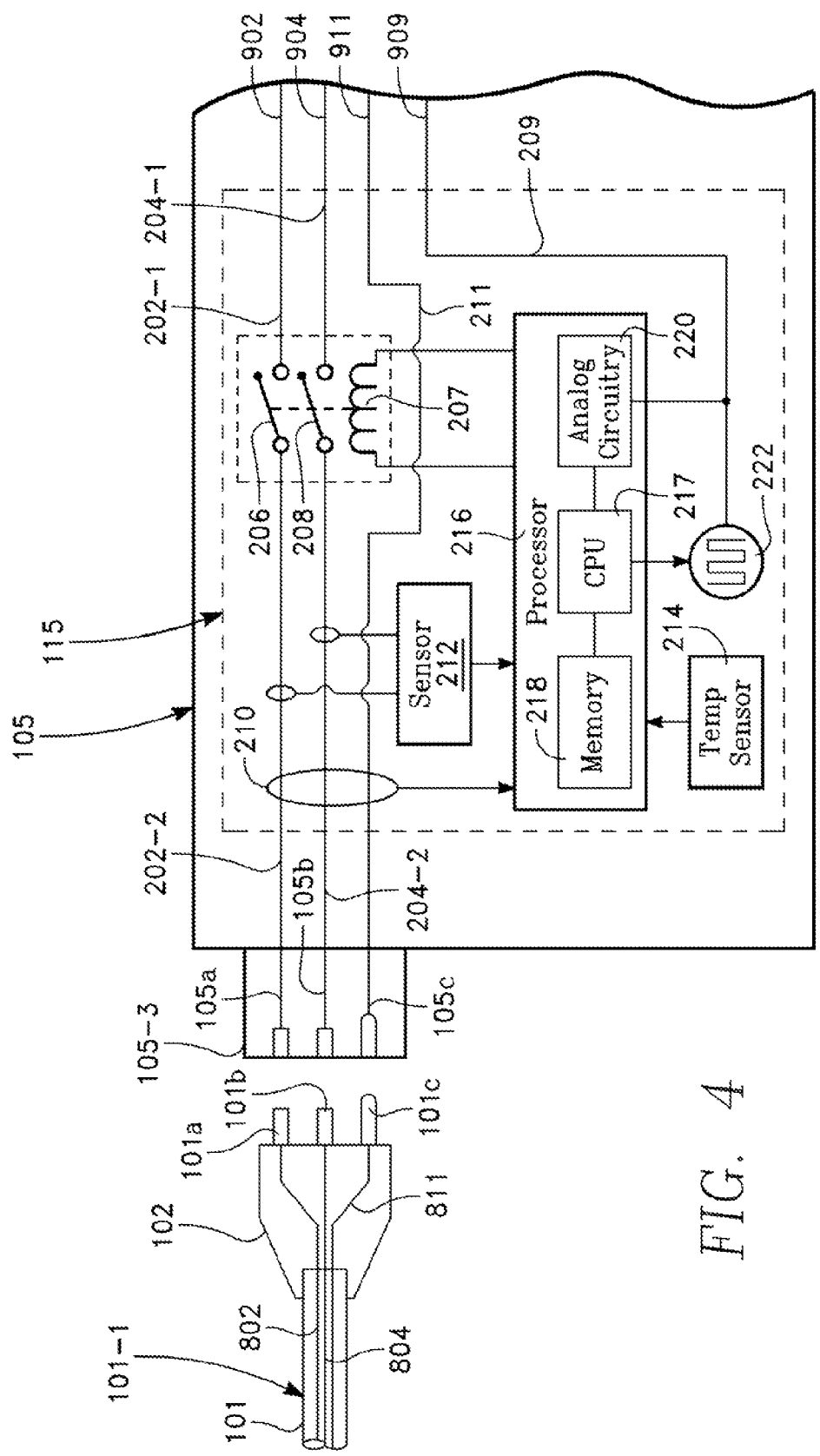
FIG. 4 is a schematic diagram corresponding to FIG. 1.

Referring to FIG. 4, the embedded EVSE controller 115 includes a first contactor 206 providing interruptable power flow between respective power conductors 202-1 and 202-2, and a second contactor 208 providing interruptable power flow between respective conductors 204-1 and 204-2. The embedded EVSE controller 115 further includes a control pilot conductor 209 and a neutral conductor 211. As shown in FIG. 4, the docking connector 105 contains a pair of internal insulated power conductors 902, 904 connected to the power conductors 202-1 and 204-1, respectively, a control pilot conductor 909 connected to the control pilot conductor 209 and a neutral conductor 911 connected to the neutral conductor 211. The conductors 902, 904, 909 and 911 extend through the head 105-2 to docking head connection elements (not shown) that are removably engagable with the EV charging port 107, as noted above.

The barrel electrical connector 105-3 provided on a near end of the barrel 105-1 includes individual barrel connector conductors 105a, 105b and 105c connected to the conductors 202-2, 204-2 and 211, respectively, of the embedded EVSE controller 115.

Figure 5:
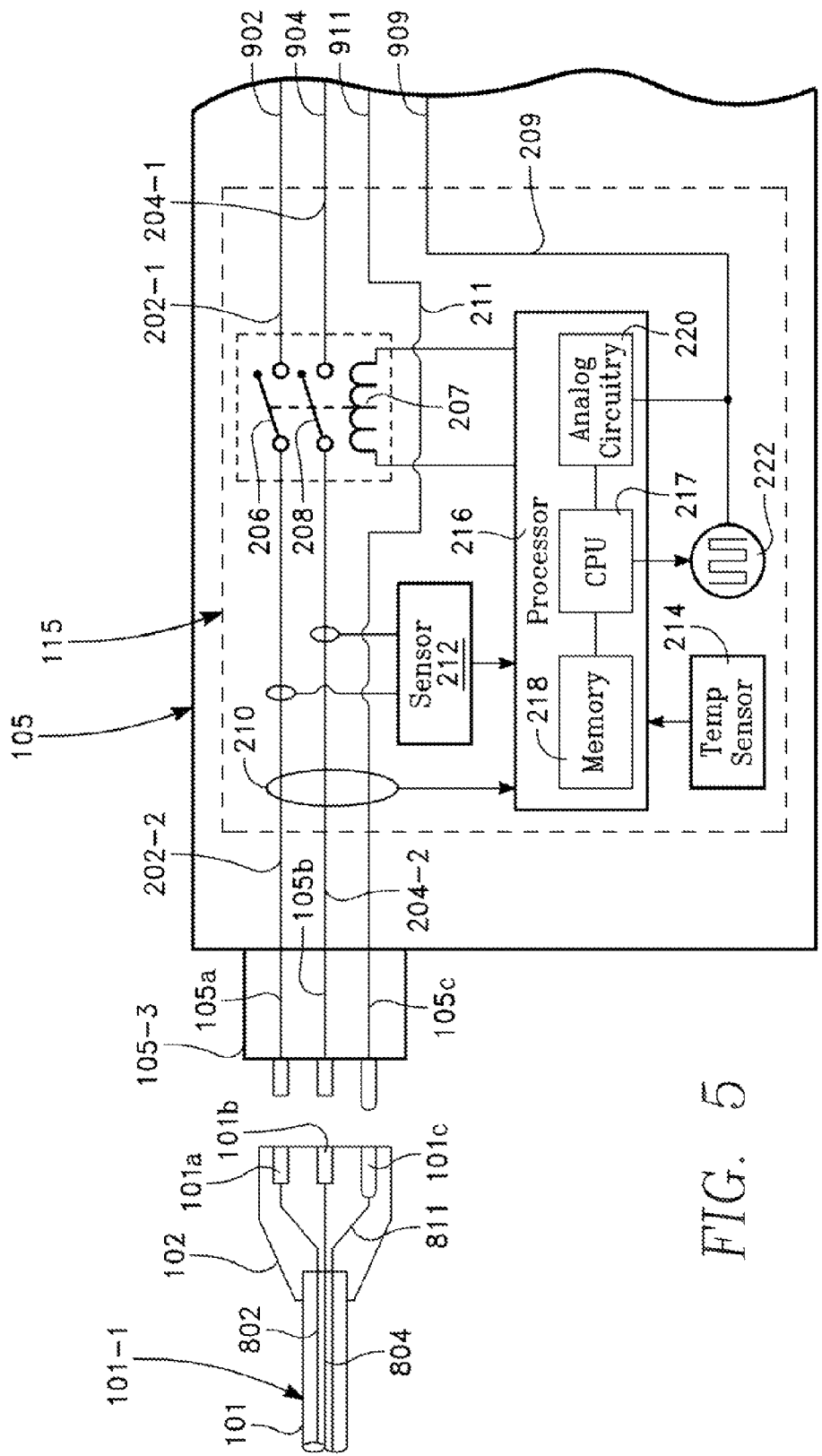
FIG. 5 is a schematic diagram corresponding to FIG. 2.

The cable 101 contains a pair of insulated power conductors 802, 804 and a neutral conductor 811. The docking end 101-1 of the cable 101 is terminated at a cable electrical connector 102 having cable connector conductors 101a, 101b, 101c connected to the cable power conductors 802, 804 and the neutral conductor 811, respectively. The cable connector conductors 101a, 101b, 101c are engagable with the barrel connector conductors 105a, 105b and 105c, respectively, upon engagement of the cable electrical connector 102 with the barrel electrical connector 105-3. In the embodiment of FIGS. 1 and 4, the barrel connector conductors 105a, 105b and 105c are female sockets while the cable connector conductors 101a, 101b, 101c are male prongs. However, the male and female roles may be reversed, as in the embodiment of FIGS. 2 and 5, in which the barrel connector conductors 105a, 105b and 105c are male prongs while the cable connector conductors 101a, 101b, 101c are female sockets.

FIG. 3 depicts the charging of an EV 109 from a utility A.C. power outlet 113 by the EVSE system including the power cable 101, the cable utility connector (plug) 110 and the docking connector 105 containing the embedded EVSE controller 115. The power cable 101 and the docking connector 105 containing the embedded EVSE controller 115 are portable and are readily stored within the EV 109 during travel.

The utility end 101-2 of the charging cable 101 has the cable utility connector (plug) 110 connectable to a standard 240 Volt AC power outlet. In one embodiment, the plug 110 and the AC power outlet 113 conform with National Electrical Manufacturers Association Specification NEMA 6-50 for 240 Volt A.C. electrical connectors.

Optionally, as depicted in FIG. 1, a 120 Volt-to-240 Volt plug adapter 112 connectable to a standard 120 Volt AC power outlet may be tethered to the utility end 101-2 of the cable 101.

The plug 110 may include an internal ground-fault interrupt (GFI) circuit housed inside the plug 110, as will be described later in this specification. The plug 110 may be enclosed or encased in an insulating material forming the exterior surface of plug 110, this exterior surface being visible in the drawing of FIG. 1. The volume enclosed by the exterior surface, in one embodiment, is sufficient to contain the plug conductors and, in addition, the internal GFI circuit. If the GFI circuit senses a ground fault, it interrupts power flow from the plug 110 to the cable 101.

The barrel electrical connector 105-3, the cable electrical connector 102, the plug 110 and the outlet 113 may all be 240 Volt AC standard male/female connectors or other suitable connectors.

Figure 6:
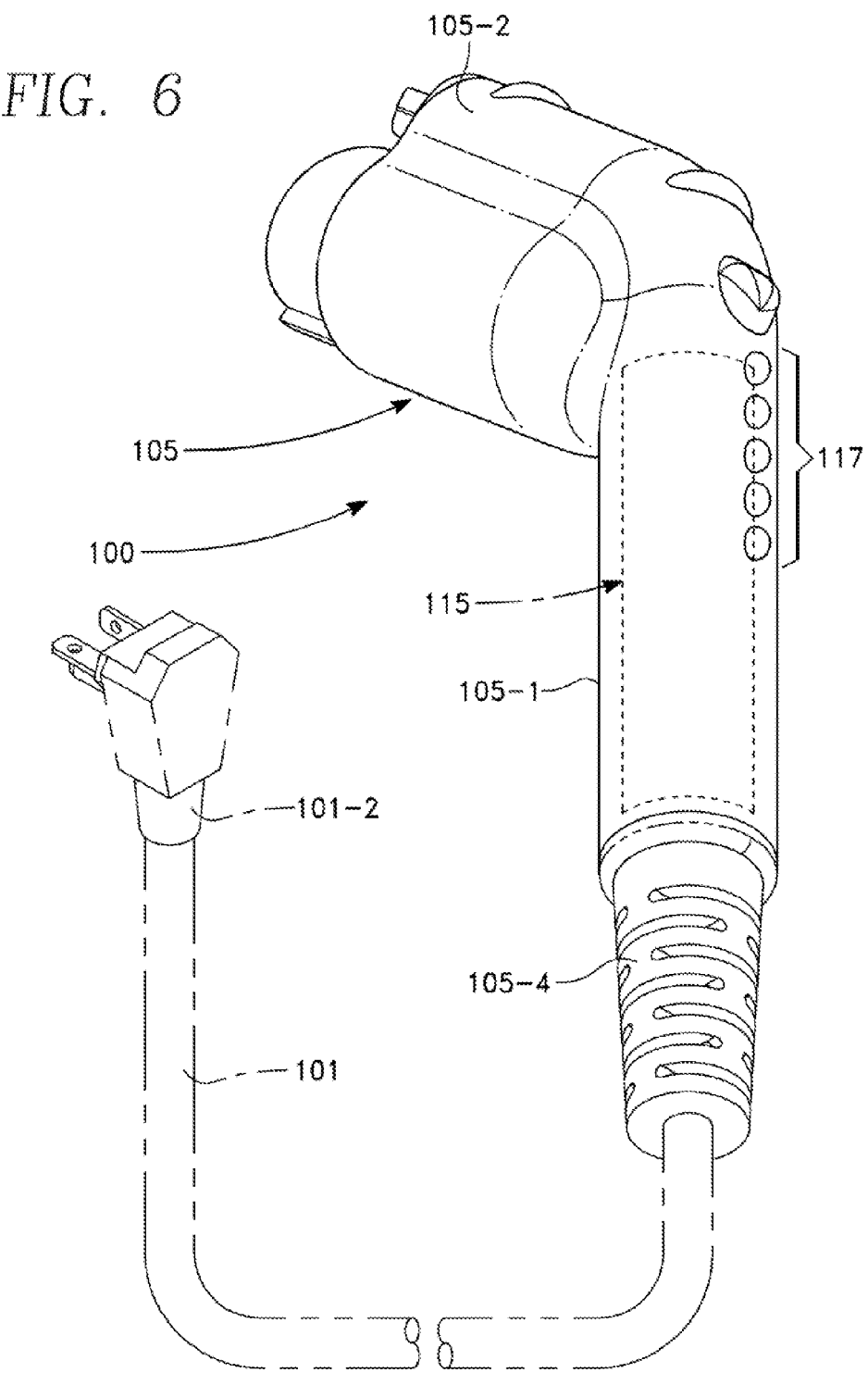
FIG. 6 illustrates an embodiment of the EVSE kit in which the power cable and the docking connector with the embedded EVSE controller are permanently connected together through a flexible strain relief.
Figure 7:
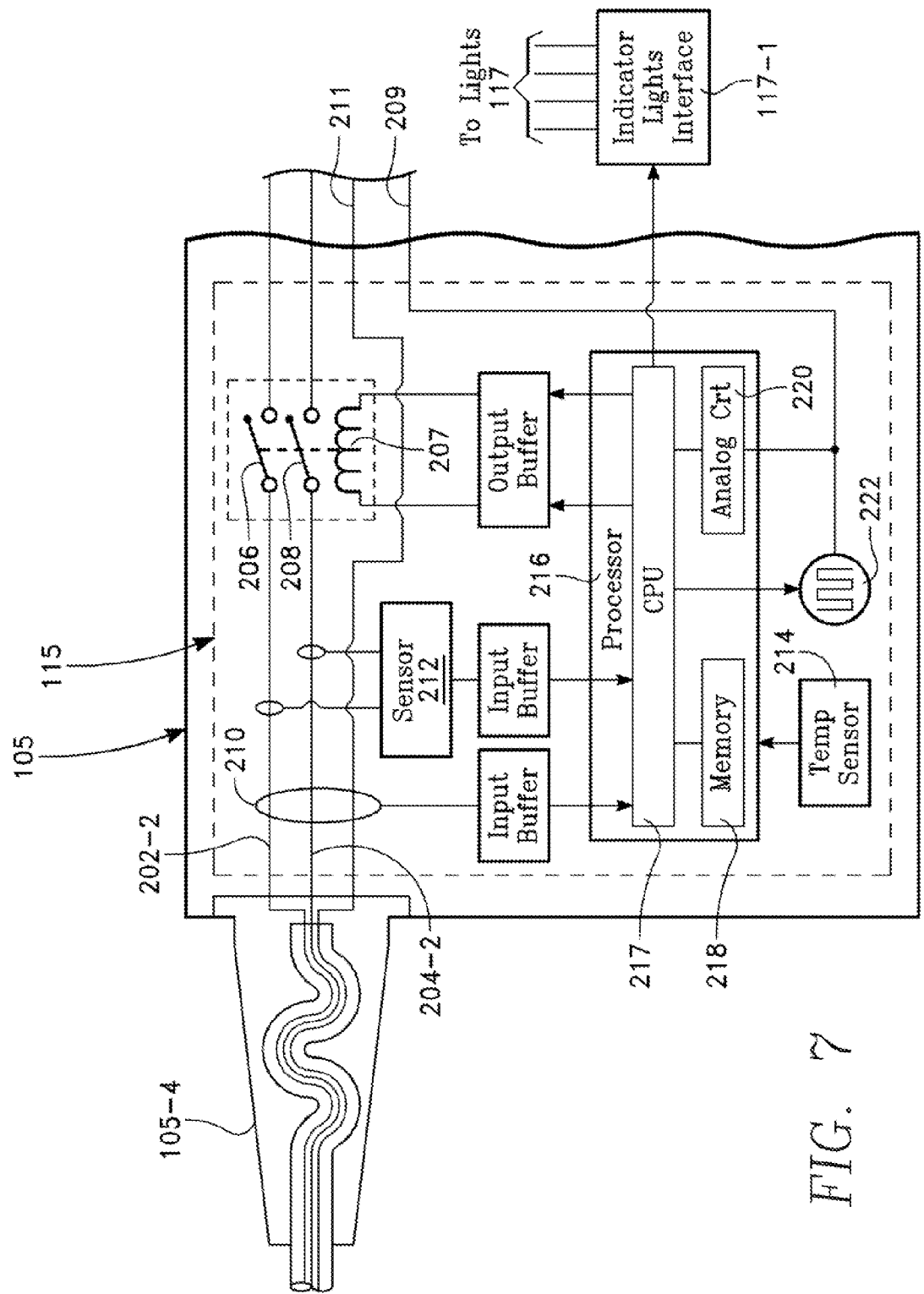
FIG. 7 is a schematic diagram corresponding to FIG. 6.

In an alternative embodiment depicted in FIGS. 6 and 7, the cable electrical connector 102 and the barrel electrical connector 105-3 are replaced by a permanent connection of the cable 101 to the docking connector 105 through a flexible cable strain relief 105-4.

In the foregoing embodiments, the embedded EVSE controller 115 provides the docking connector 105 with the complete functionality of an EVSE unit, including the capability to perform charging of an EV and to perform the communication protocols required by the EV on-board systems. For this purpose, the embedded EVSE controller 115 includes circuit elements and programmable controller elements adapted to implement the required functionality, as will now be described with reference to FIG. 4.

Within the embedded EVSE controller 115, the contactors 206, 208 are opened and closed by an actuator 207 which may be a solenoid or other suitable device, and will be referred to herein as a solenoid. Communication between EVSE controller 115 and the EV 109 is carried over the control pilot conductor 209. Such communication may be implemented in accordance with the communication protocols defined in Section 5.3 of the Society of Automotive Engineers Specification SAE J1772. The neutral grounded conductor 211 extends through the entire length of the charging cable 101.

The embedded EVSE controller 115 may include various sensors, such as a ground-fault sensor 210, a sensor 212 connected to the power conductors 202-2 and 204-2 and adapted to sense voltage (and/or phase and/or frequency) of the incoming power from the power outlet 113, and a temperature sensor 214 to monitor temperature inside the embedded EVSE controller 115. Operation of the embedded EVSE controller 115 is governed by a computer or processor 216. Each of the sensors 210, 212 and 214 has an output connected through an appropriate input signal buffer to an input of the processor 216. The processor 216 has a central processing unit (CPU) or microprocessor 217 and a memory 218 storing a set of program instructions in the form of firmware. The microprocessor 217 executes the program instructions to perform various functions including implementing the required communication protocols with the on-board systems of the EV. If the communication protocols are those defined in Society of Automotive Engineers Specification SAE J1772, they are implemented by the embedded EVSE controller 115 and the on-board computer 360 of the EV 109 imposing a sequence of voltage changes on the control pilot conductor 209. For this purpose, analog circuitry 220 of the embedded EVSE controller 115 is coupled between the microprocessor 217 and the control pilot conductor 209. This feature enables the microprocessor 217 to impose the required voltage changes on the control pilot conductor 209 (and to sense voltage changes imposed on the control pilot conductor 209 by the internal systems of the EV 109). Pulse modulation of the voltage on the control pilot conductor 209 is performed by a pulse generator 222 whose pulse duty cycle is controlled by the microprocessor 217. The pulse duty cycle signifies to the EV the maximum allowable charging current that may be drawn from the EVSE.

If the microprocessor 217 determines from the sensor 212 that the utility connector or plug 110 is connected to a voltage of 120 volts, then the microprocessor 217 sets the pulse duty cycle to a value signifying a particular current level (e.g., a Level 1 current level defined by SAE J1772). If the microprocessor 217 determines that the utility connector 110 is connected to a voltage of 240 volts, then the microprocessor 217 may set the pulse duty cycle to a value signifying another current level (e.g., a Level 2 current defined by SAE J1772). Such current levels may be predetermined in accordance with the current ratings of the charging cable 101, and the current ratings of the 220 Volt plug 110 and the 120 Volt adapter 112.

The D.C. voltage on the control pilot conductor 209 is controlled and sensed through the analog circuitry 220 by the microprocessor 217 in accordance with the required communication protocol. The microprocessor 217 controls the solenoid 207 to open or close the contactors 206, 208. The microprocessor 217 monitors the outputs of the ground fault interrupt sensor 210, the voltage/frequency/phase sensor 212 and the temperature sensor 214 to determine whether any conditions arise that are outside of a prescribed set of conditions (e.g., voltage beyond a prescribed range, temperature outside of a prescribed range, ground fault occurrence, etc.), and if so, opens the contactors 206 and 208. Such an occurrence may be indicated under control of the microprocessor 217 on a user interface or by external lights or light emitting diodes (LEDs) 117 provided on the docking connector 105 as shown in FIG. 1. The LED's 117 are controlled by the microprocessor through an interface 117-1. The light patterns for different conditions may be specified for the user and are implemented by the microprocessor 217.

Figure 8:
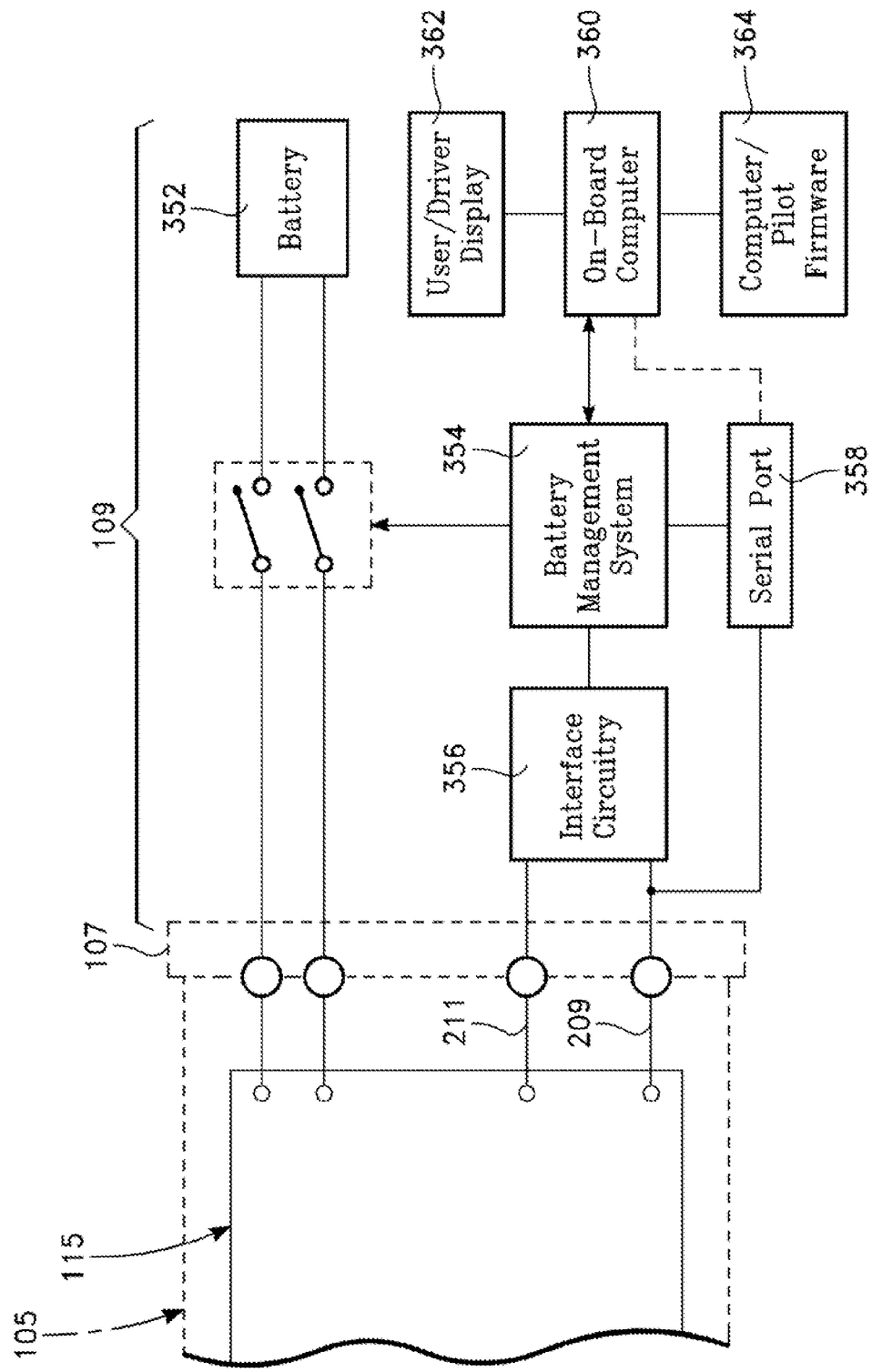
FIG. 8 is a simplified block diagram of the connections through the docking connector between the embedded EVSE controller and elements within the electric vehicle.

FIG. 8 is a simplified diagram depicting certain components of the EV 109 of FIG. 3 and their connection through the EV charging port 107 to the embedded EVSE controller 115 of FIGS. 1 and 4. These components include a battery pack 352 and a charge controller or battery management unit 354. In addition, analog circuitry 356 may be provided to enable the charge controller 354 to respond to and impose changes in voltage on the control pilot conductor 209 of the embedded EVSE controller 115. This feature enables the charge controller 354 to respond appropriately to changes in voltage on the control pilot conductor 209 in accordance with the required communication protocol referred to above.

The embedded EVSE controller 115, in one embodiment, automatically detects (through the sensor 212) the voltage input through the cable 101, and ascertains the appropriate voltage range, which is either Level 1 (i.e., 120 VAC+10%) or Level 2 (i.e., 240 VAC+10%). Once the appropriate range has been ascertained, the microprocessor 217 constantly compares the actual voltage measured by the sensor 212 with the appropriate voltage range, and issues an alarm or halts charging whenever (for example) an over-voltage condition occurs. Therefore the docking connector 105 containing the embedded EVSE controller 115 can be operated as a Level 1 or Level 2 EVSE depending upon the attached plug connector.

Figure 9:
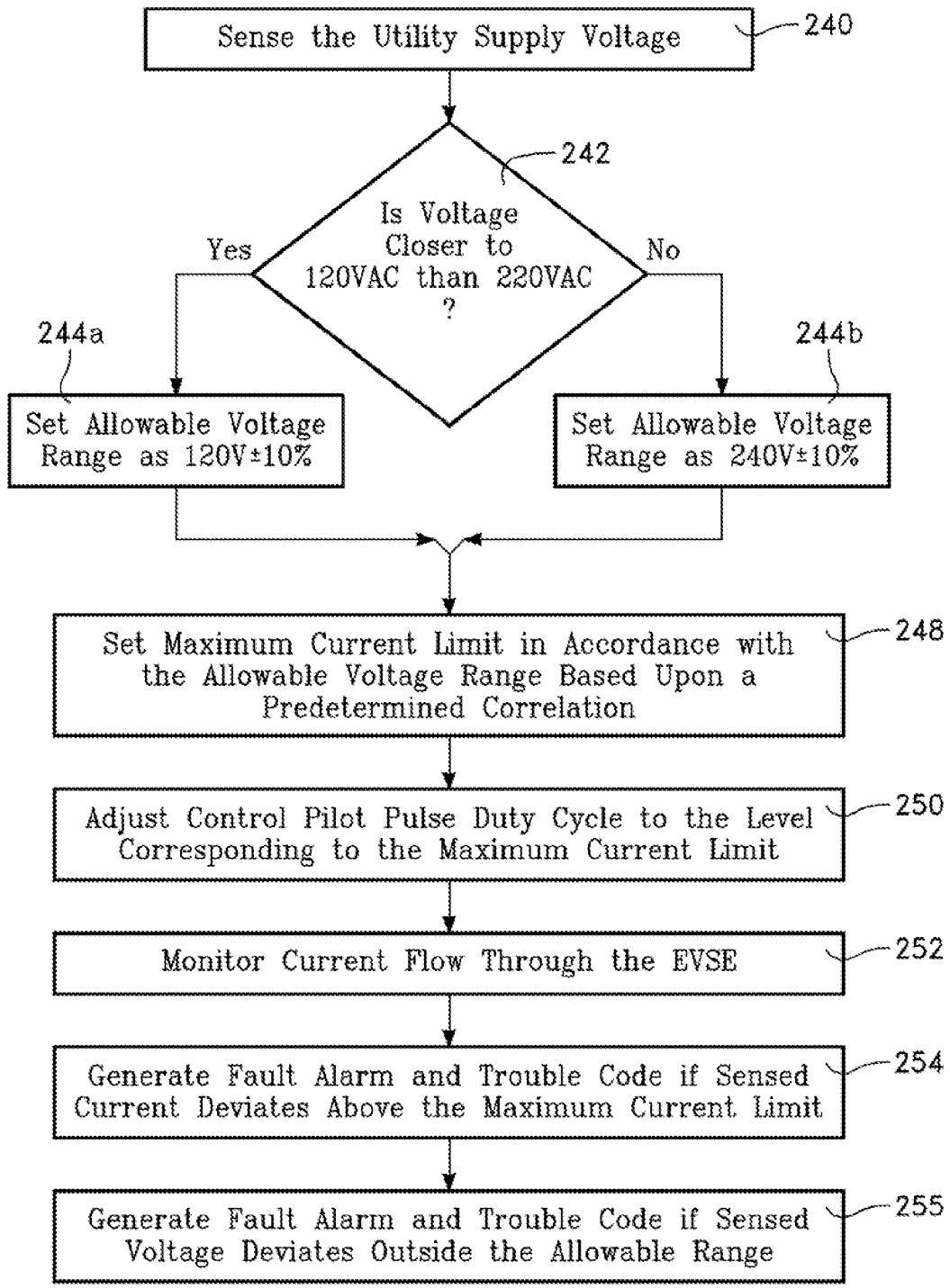
FIG. 9 is a flow diagram depicting a method performed in the embodiment of FIG. 1 for automatically adjusting to different utility supply voltages.

FIG. 9 depicts one method for automatically adapting to the voltage range. In this method, the microprocessor continually monitors the utility supply voltage using the sensor 212 (block 240 of FIG. 9). The microprocessor 217 determines whether the sensed voltage is closer to 120 VAC—"Level 1", or 240 VAC—"Level 2" (block 242). If the sensed voltage is closer to 120 VAC (YES branch of block 242), then the microprocessor 217 establishes the allowable voltage range as 120 VAC+10% (block 244a). If the sensed voltage is closer to 240 VAC (NO branch of block 242), then the microprocessor 217 establishes the allowable voltage range as 240 VAC+10% (block 244b).

In a further aspect, the designer may have established a maximum allowable current level, which may be the same for both possible voltage ranges (i.e., Level 1 and Level 2) or may be different for the two ranges. For example, the maximum allowable current level may be higher for the Level 2 voltage range than for the Level 1 voltage range, to take advantage of the higher current levels allowed by the specification SAE J1772 for Level 2 voltages. The microprocessor 217 sets the maximum allowable current level (block 248 of FIG. 9), which may depend upon whether the allowable voltage range is a Level 1 voltage or a Level 2 voltage. The microprocessor 217 sets the pulse generator 222 to a duty cycle corresponding to the maximum allowable current level (block 250).

The microprocessor 217 monitors the current using the output of the sensor 212 (block 252) and produces an alarm and a trouble code if the current exceeds the limit (block 254). The microprocessor 217 continues to monitor the utility supply voltage, and if the sensed voltage deviates outside of the allowable voltage range, the microprocessor 217 generates a fault alarm to the user and stores a corresponding trouble code in the memory 218 (block 255).

Figure 10:
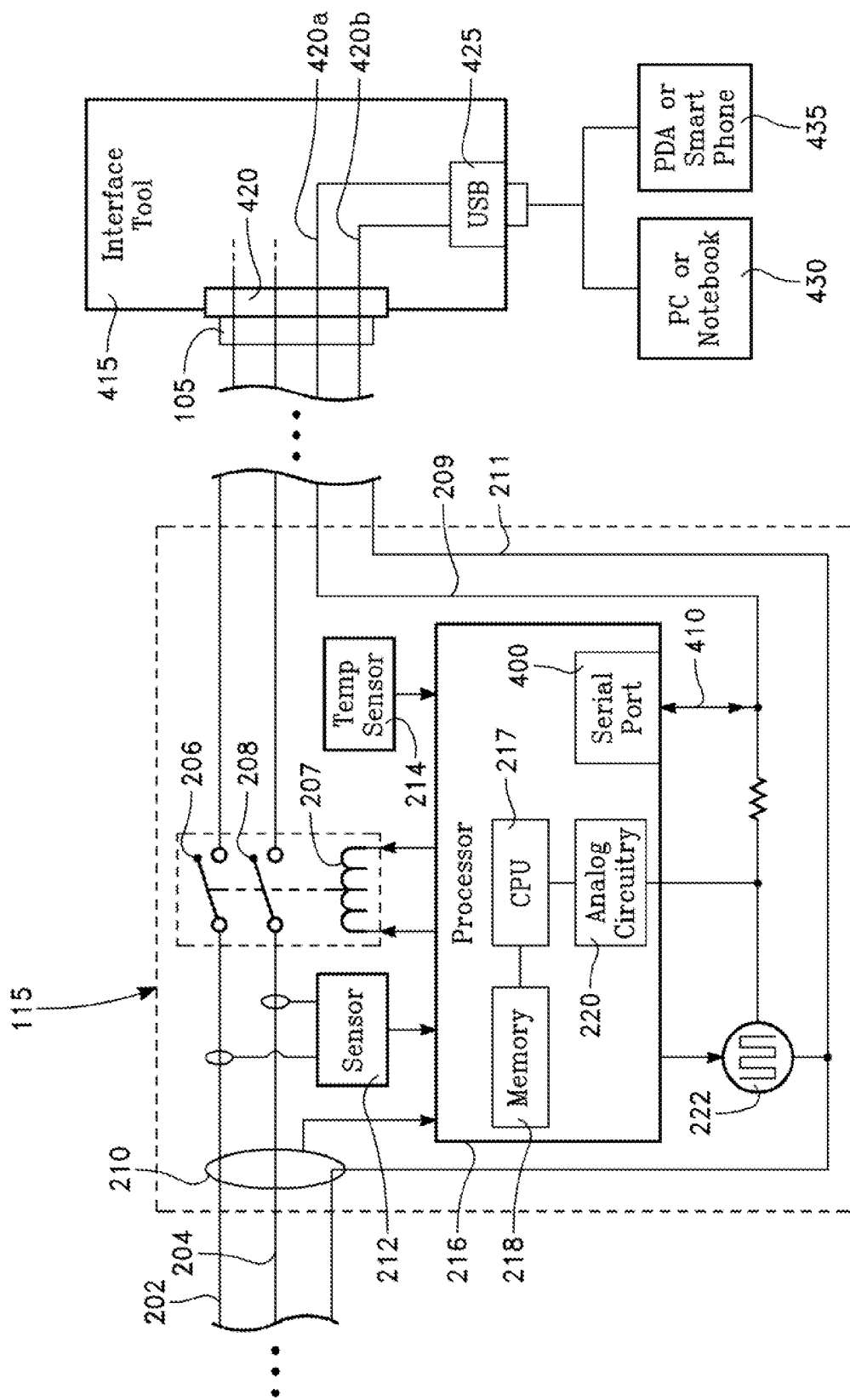
FIG. 10 is a simplified block diagram depicting an embodiment in which the portable cable facilitates file uploading from an external computer through a special interface tool.

File Uploading/Downloading via Control Pilot Serial Port:

In accordance with one embodiment, provision is made for serial data transfer from and to the microprocessor 217 over the control pilot conductor 209. Referring now to FIG. 10, the microprocessor 217 has a serial port 400 that provides serial data transfer in accordance with a suitable serial data transfer protocol such as Universal Serial Bus (USB) or RS232. The appropriate driver firmware may be stored in the memory 218 to enable the microprocessor 217 to implement data transfer via the control pilot conductor 209 in both directions. A serial bus or conductor 410 connects the serial port 400 with the control pilot conductor 209. The control pilot conductor 209 thus functions as (A) a communication channel for the analog D.C. voltage level changes by which the EVSE and the EV communicate with each other and (B) a two-way serial bus for digital communication.

External access to the serial port 400 via the control pilot conductor 209 is provided through a stand-alone interface tool 415 shown in FIG. 10. The interface tool 415 has an interface tool connector port 420 able to mate with the EVSE connector 105 whenever the EVSE connector 105 is not mated to the EV charging port 107. Whenever the EVSE connector 105 is mated with the interface tool connector port 420, one pin 420a of the interface tool connector port 420 is coupled to the control pilot conductor 209, while a second pin 420b is coupled to the neutral conductor 211. A user-accessible serial port 425, such as a USB port, is provided on the interface tool 415 and is connected to the pins 420a and 420b through internal conductors inside the interface tool 415.

Whenever it is desired to communicate with the microprocessor 217 or verify contents of the memory 218 or to perform file transfers (e.g., to upload a latest revision of firmware) to the microprocessor 217 and/or memory 218, the EVSE connector 105 is disconnected from the EV charging port 107 and connected instead to the interface tool connector port 420. The interface tool connector port 420 provides for connection between the control pilot conductor 209 and the user-accessible serial port 425. The serial port 425 may be implemented as a USB connector which may be connected to a computer 430 (e.g., a personal computer or a notebook computer) or to a handheld programmable communication device 435, such as a PDA (personal digital assistant) or a smart phone or equivalent device. Both the processor 216 and the computer 430 (or PDA 435) contain respective firmware program instructions that enable a user to perform various tasks, such as downloading and interpreting EVSE trouble codes, verifying the software version of programs stored in the memory 218, deleting obsolete software stored in the memory 218 and uploading updated versions of the software from the computer 430 or PDA 435 to the memory 218. The character representation of each EVSE trouble code and the conditions under which it is to be issued by the microprocessor 217 are predetermined by the system designer.

Provision may be made for the EV 109 to transmit diagnostic trouble codes to the EVSE. In this case, these trouble codes may be stored in the memory 218 of the in-line controller 115, and later (when the EV 109 and EVSE 100 are no longer connected) downloaded through the interface tool 415 for evaluation or diagnosis by a technician.

The interface tool 415 may be provided as a portable tool that the user may store at home. The interface tool 415 may be provided as standard equipment stored in the EV along with the portable charging cable 100. The interface tool 415 may be provided in a kiosk at a vehicle dealer for example, that can be visited by the user. The interface tool 415 may be provided as a professional technician's tool for use by repair facilities or dealers. In this latter case, the interface tool 415 may include most or all of the functionality of a computer 430 (including a microprocessor and memory, a display, and program firmware for downloading and interpreting trouble codes), so as to be a self-contained hand-held diagnostic tool. Software updates may be obtained by the computer 430, the handheld communication device 435, or by the interface tool 415 itself, via a communication channel such as a dedicated radio link, a local area network or via the internet.

Figure 11:
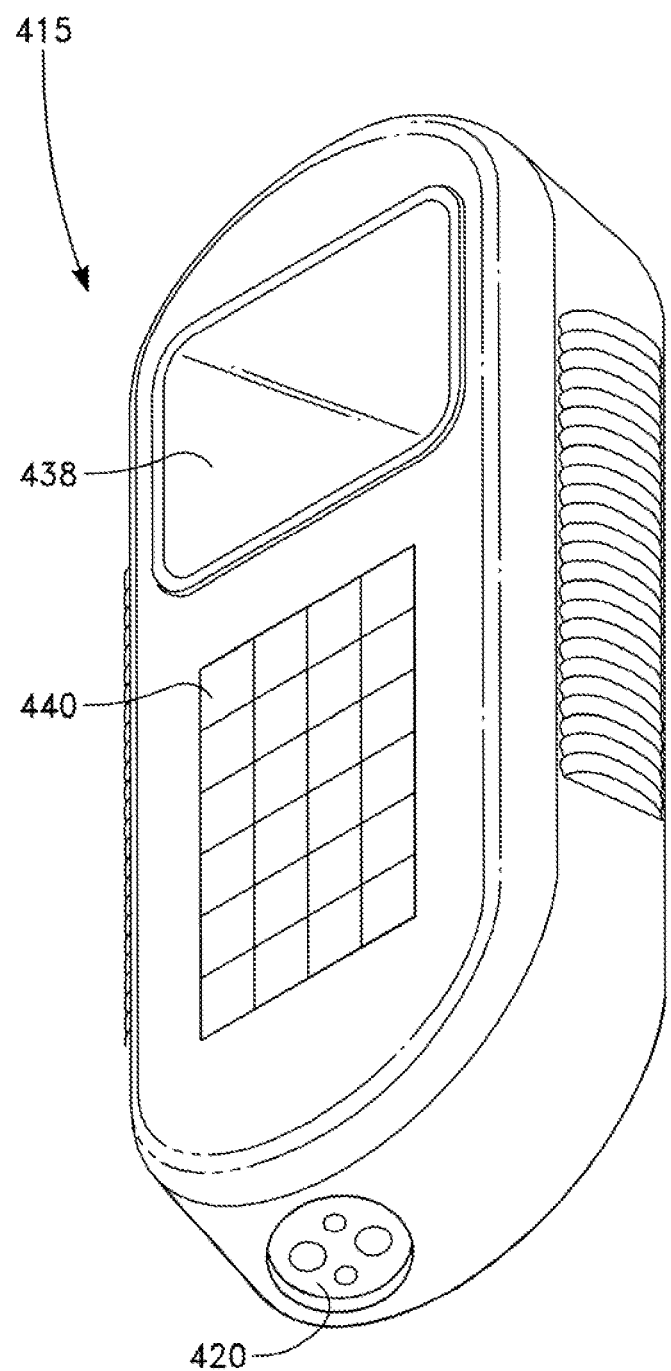
FIG. 11 is an orthographic view of a robust handheld embodiment of the special interface tool of FIG. 10.
Figure 12:
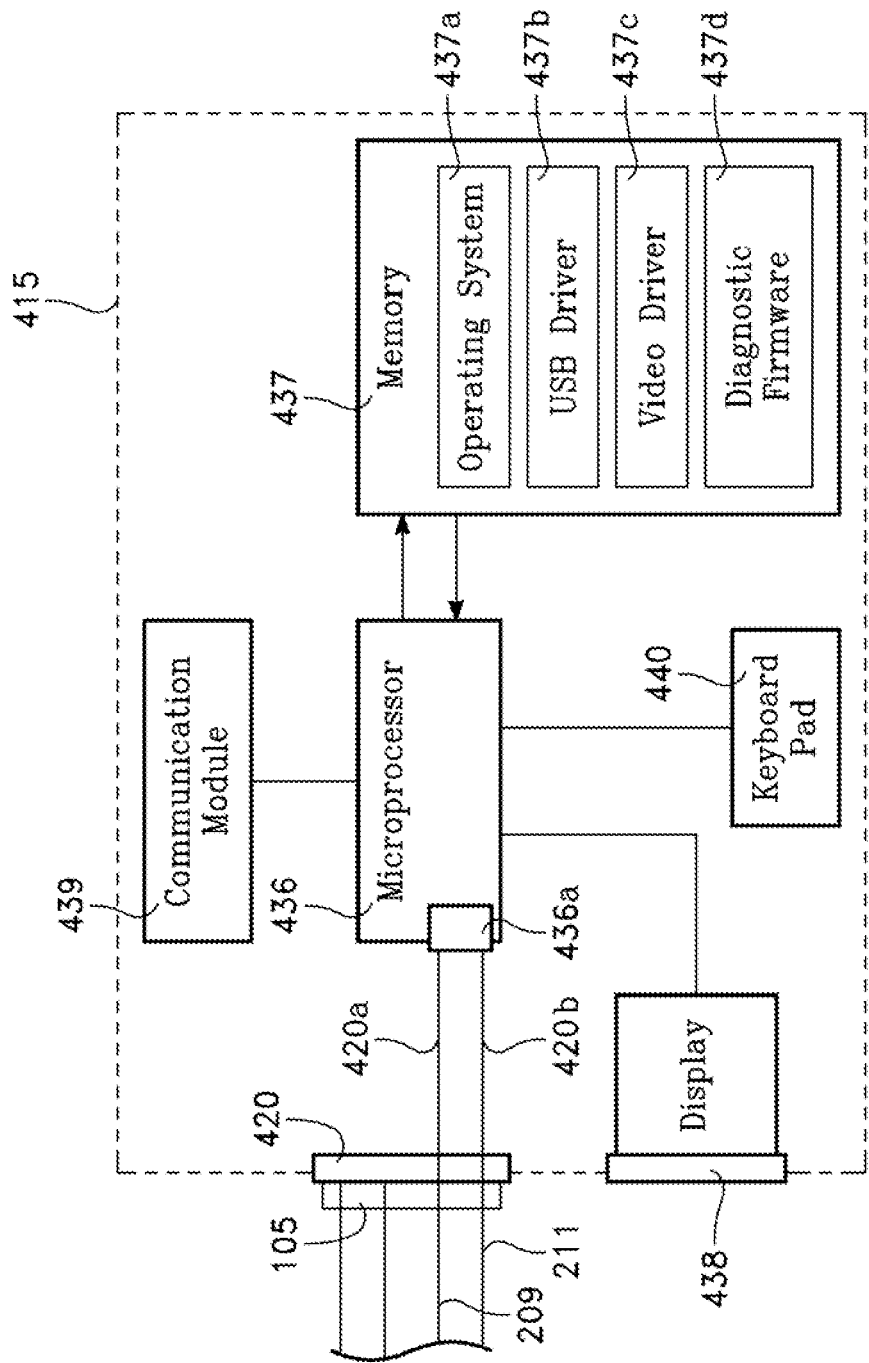
FIG. 12 is a simplified schematic block diagram of the special interface tool of FIG. 11.

FIGS. 11 and 12 depict a versatile handheld embodiment of the interface tool 415. FIG. 11 depicts how the interface tool may be shaped while FIG. 12 depicts its internal architecture. In FIG. 11, the interface tool 415 includes the connector port 420. The connector port 420 may be compatible with the type specified by the Society of Automotive Engineers Specification SAE J1772, for connection to the docking connector 105 of FIG. 1 (or FIG. 2). The interface tool 415 of FIGS. 11 and 12 further includes a microprocessor 436, a memory 437 and a display or video monitor screen 438. The microprocessor 436 includes a serial port 436*a* that is connected to the connector port pins 420*a*, 420*b* to facilitate communication with the EVSE's microprocessor 217. The microprocessor 436 controls the display 438 and is coupled to the memory 437. The memory 437 stores firmware including an operating system 437*a*, a USB driver 437*b* for communication with the EVSE's microprocessor 217 and a video driver 437*c* for controlling the display 438. In addition, the memory 437 may store diagnostic firmware 437*d* enabling the microprocessor 436 to interpret trouble codes and status data received from the EVSE microprocessor 217 and to generate representative images on the display 438 that enable the user to understand the status of the EVSE controller 115 and to understand the trouble codes. A communication module 439 coupled to the microprocessor 436 enables the microprocessor 436 to access new information via a communication network such as the internet or a local area network (e.g., within a facility such as a vehicle dealership). For example, the communication module 439 may include conventional wireless local area networking hardware. A keypad 440 may be provided on the interface tool 415 to enable the user (e.g., a technician) to enter commands to the EVSE microprocessor 217 (e.g., requesting a particular data transfer or information) and/or to respond to prompts on the display 438 generated by the diagnostic firmware. The display 438 may be a touch screen, enabling the user to communicate to the microprocessor 436. In this case, the key pad 440 may not be required.

The information obtained from the EVSE controller 115 by the interface tool 415 may include the current status of the EVSE controller 115 (e.g., temperature within range, supply voltage within range, frequency within range, no GFE faults, etc.). This information may be displayed on a monitor of the computer 430 or on a display screen of the PDA 435, for example. Or, if the interface tool 415 is the versatile embodiment of FIGS. 11 and 12, then the information may be displayed on the screen or display 438 of the interface tool 415.

In an alternative embodiment, the information obtained from the microprocessor 217 via serial data communication on the control pilot conductor 209 may be displayed on the driver's display of the EV 109. This would be possible whenever the EVSE docking connector 105 is connected to the EV charging port 107, not to the interface tool 415. In such a case, an on-board computer of the EV 109 may be programmed to obtain the information through the EV battery management system. With regard to such a feature, the EV 109 of FIG. 8 includes a serial port 358 that is coupled to the control pilot conductor 209 of the EVSE controller 115 whenever the EVSE docking connector 105 is connected to the EV 109. In addition, FIG. 8 depicts further elements of the EV 109, including an on-board computer 360 and an EV driver display 362 controlled by the on-board computer 360. The on-board computer 360 may access firmware 364 that enables it to communicate with the battery management system 354 to obtain information via the serial port 358 (or the on-board computer 360 may communicate directly with the serial port 358). In this way, during the time that the EV 109 is being charged through the docking connector 105, information concerning the status of the EVSE controller 115 may be displayed on the EV driver display 362. As noted above, the displayed information may include current status of the EVSE controller 115, a history of past trouble codes, identification of the firmware version stored in the EVSE memory 218, and related information.

Figure 13A:
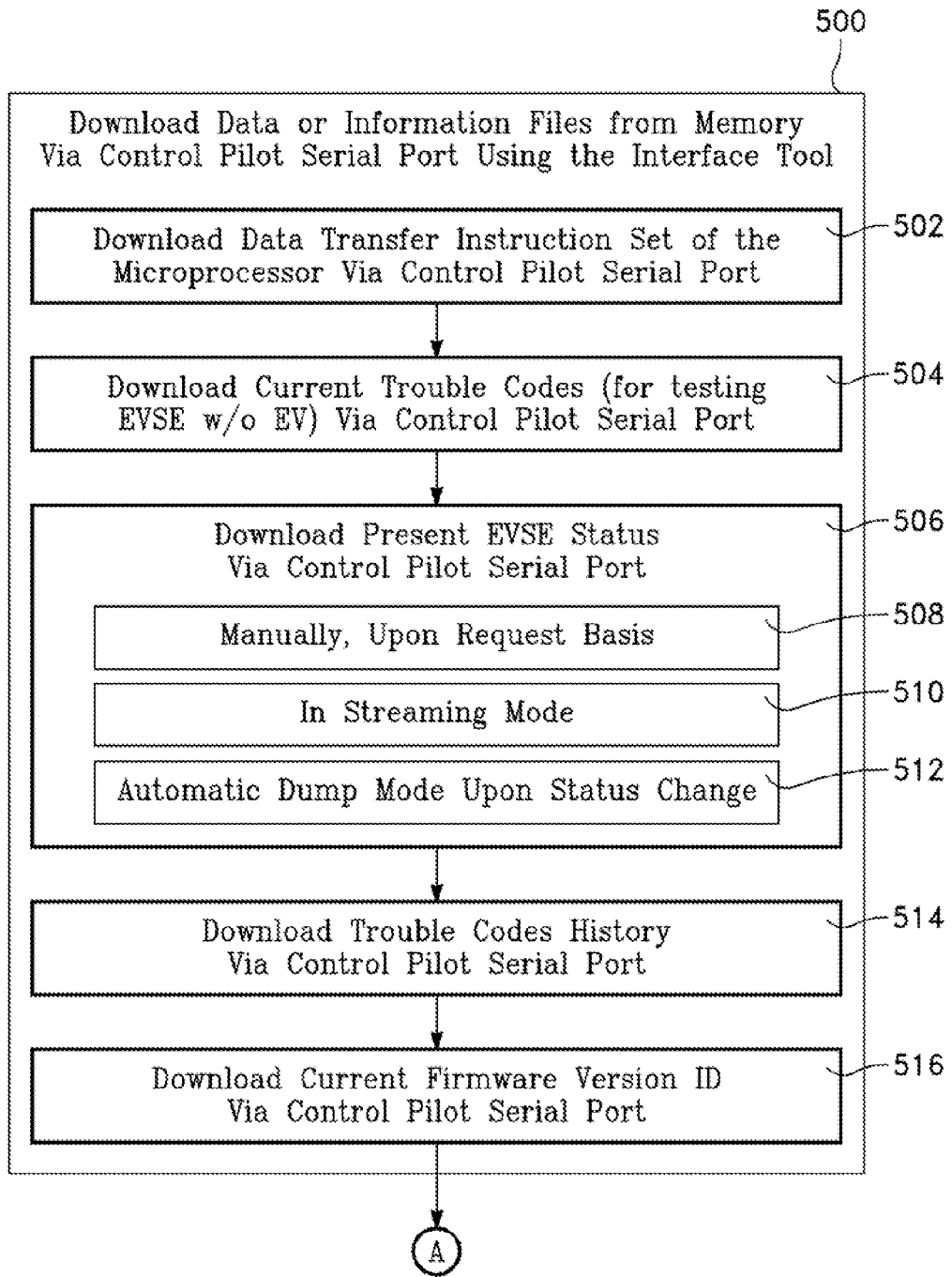
FIGS. 13A and 13B together constitute a flow diagram depicting methods of operation in the embodiment of FIG. 10.
Figure 13B:
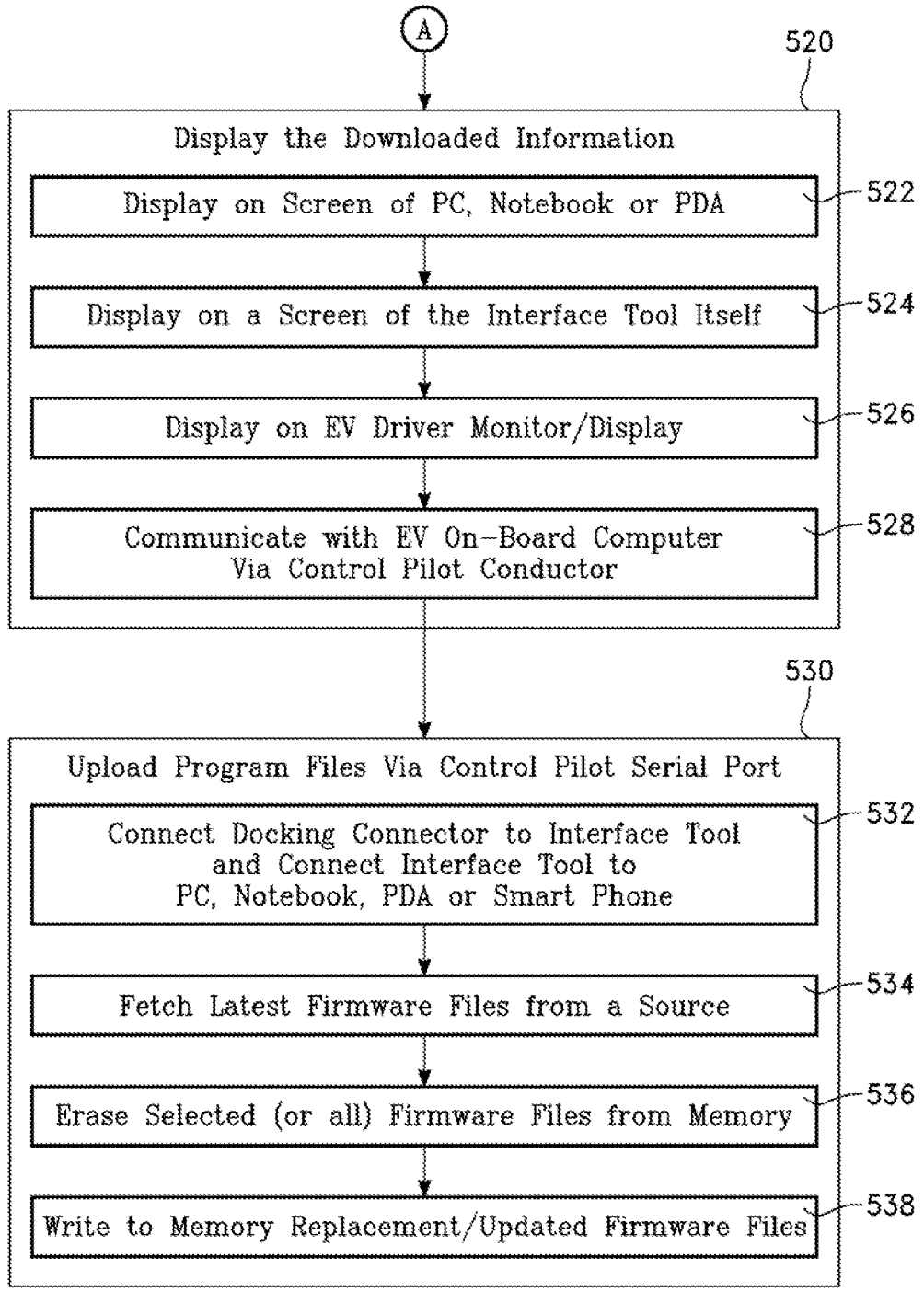

FIGS. 13A and 13B depict a method using the control pilot conductor as a serial bus to communicate digital information to and from the EVSE memory 218 and microprocessor 217 using the interface tool 415 of FIG. 11 with the computer 430 or using the interface tool of FIGS. 11 and 12. The operations depicted in FIGS. 13A and 13B rely upon the EVSE memory 218 containing certain components as depicted in FIG. 14.

Figure 14:
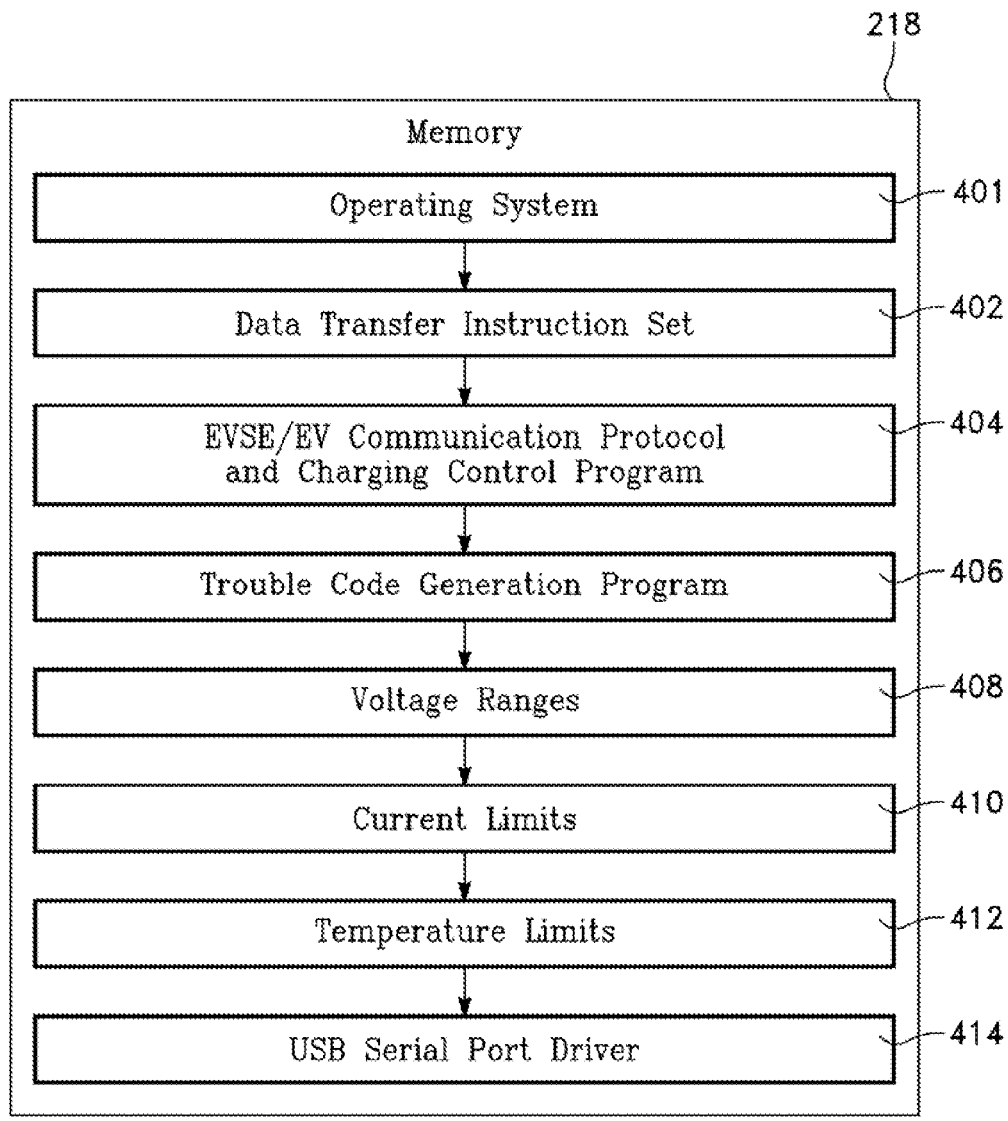
FIG. 14 is a block diagram depicting the contents of a memory used in the method of FIGS. 13A and 13B.

Referring to FIG. 14, the components stored in the memory 218 may include an operating system 401, and a set of instructions 402 that may be used control the microprocessor 217 to perform particular data transfer operations. These operations may include downloading specified information in the memory 218, erasing specified locations in the memory 218, and uploading new files to specified locations in the memory 218. The components stored in the memory 218 may further include a firmware package or program 404 that enables the microprocessor 217 to perform the required communication protocols and charge the EV 109 in accordance with the required procedures. The memory 218 may further contain a program 406 that enables the microprocessor 217 to generate appropriate trouble codes whenever a fault (or condition violating the requirements of a controlling specification) is detected. The memory 218 may also contain a list of allowed voltage ranges 408, current limits 410, temperature limits 412 and a may contain a USB driver 414.

Referring again to FIGS. 13A and 13B, a first operation (block 500) is to download data or information files from the memory 218 to the computer 430 via the control pilot conductor 209 serial port 400 using the interface tool 415. There are various tasks this operation can perform. A first task may be for the computer 430 to download the data transfer instruction set of the microprocessor 217 via the serial port 400 (block 502). This would enable the user to select the proper instruction to command the microprocessor 217 to perform specific data transfer tasks. One such task may be to download current trouble codes (block 504), which may be used, for example, in testing the EVSE 100 in the absence of the EV 109. Another task may be to download the present EVSE status (block 506). This task may be performed in one of three modes, depending upon the command asserted by the computer 430: (1) manually, upon request (block 508), (2) continuously, in streaming mode (block 510), and (3) an automatic dump of information upon status change (block 512).

A further download task may be to download the entire history of trouble codes stored in the memory 218 (block 514). Another download task may be to download from the memory 218 the identity (or date) of the firmware currently stored in the memory 218 (block 516) to determine whether it has been superseded or needs updating.

A next operation using the control pilot conductor 209 as a serial data bus is to display the downloaded information (block 520). This operation may use the display on a screen of the computer 430 or on a display or screen of the PDA 435 (block 522). The downloaded information may be displayed on the interface tool display screen 438 of FIG. 11 (block 524). In an alternative embodiment, the downloaded information is displayed on the EV driver display 362 of FIG. 8 (block 526 of FIG. 13B). In this embodiment, the EVSE docking connector 105 is connected to the EV charging port 107, not to the interface tool 415. The information to be displayed is communicated to the EV on-board computer 360 via the control pilot conductor 209 (block 528).

A third type of operation is to upload program files to the memory 218 via the control pilot conductor 209 (block 530). The uploaded files may be furnished from a computer 430 or PDA 435 connected to the interface tool 415. Alternatively, the uploaded program files may be furnished by the interface tool 415 itself, using its communication module 439, for example. A first step is to connect the docking connector 105 to the interface tool 415. If necessary, the interface tool 415 is connected to the computer 430 or PDA 435, in the manner illustrated in FIG. 12 (block 532). The next step is for the computer 430 (or PDA 435) to obtain the latest firmware files from a source, for example over the internet (block 534). The memory 218 may be cleared by erasing selected (or all) firmware files previously loaded into the memory 218 (block 536). The operation is completed by writing the new files to the memory 218 (block 538).

Because of the compact size and insulation of the EVSE controller 115, it may operate at fairly high internal temperatures, which need to be controlled in order to avoid overheating. In accordance with a further aspect, the microprocessor 217 may be programmed to prevent shutdown of the charging operation due to overheating of the EVSE controller 115 of FIG. 1. It does this by reducing the charging current before the temperature reaches the maximum allowed limit. Specifically, the EVSE microprocessor 217 (FIG. 4 or FIG. 5) may be programmed to override the nominal setting of the pulse duty cycle and reduce the duty cycle of the pulse generator 222, in response to the output of the temperature sensor 214 exceeding a predetermined threshold temperature (e.g., 70 degrees C.) that is 10%-30% below the maximum operating temperature of the microprocessor 217 (e.g., 85 degrees C.). It does this so as to reduce the charging current (set by the pulse duty cycle) by an amount proportional to the approach of the measured temperature to the maximum operating temperature of the microprocessor 217 (e.g., 85 degrees C.). The nominal pulse duty cycle is stored in the memory 218 at one location, the predetermined threshold temperature is stored in the memory 218 at another location and the maximum operating temperature is stored in the memory 218 at third location. The reduction in charging current may be by an amount proportional to the rise of the measured temperature above the predetermined threshold temperature. The operation is represented as a series of program instructions stored in the memory 218 and executed by the microprocessor 217, and is illustrated in FIG. 15.

Figure 15:
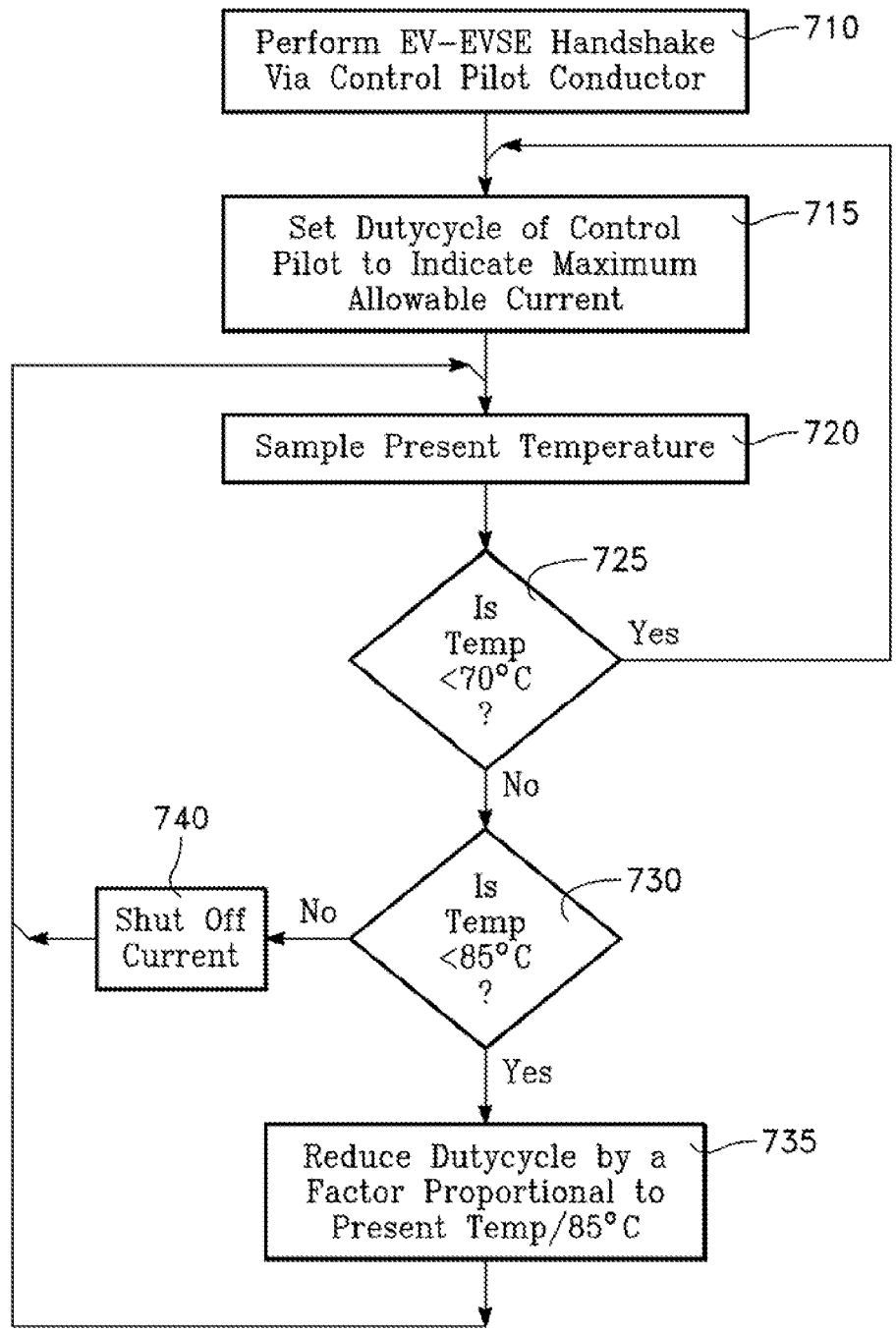
FIG. 15 is a flow diagram depicting methods of operating the embodiment of FIG. 1 for prevention of overheating during EV charging.

Referring now to FIG. 15, the EVSE controller 115 and the EV 109 perform the prescribed handshake protocol via the control pilot conductor 209 after the docking connector 105 has been inserted into the EV charging port 107 (block 710 of FIG. 15). The duty cycle of the pulse generator 222 is set to the maximum allowable current draw that was previously determined by the system designer (block 715). The output of the temperature sensor 214 is sampled to obtain a present temperature of inside the EVSE 100 (block 720). A comparison of the present temperature to the predetermined threshold temperature (e.g., 70 degrees C.) is performed (block 725). If the present temperature is below the predetermined threshold temperature (YES branch of block 725), then the operation returns to the step of block 715. Otherwise (NO branch of block 725), the present temperature is compared with the maximum operating temperature (e.g., 85 degrees C.) in block 730. If the present temperature is less than the maximum operating temperature (YES branch of block 730), then the microprocessor 217 overrides the previously set nominal duty cycle value and reduces the duty cycle from the nominal value by a factor proportional to either the ratio between the measured present temperature and the maximum operating temperature or the difference between them (block 735). In the unlikely event that the measured temperature exceeds the maximum operating temperature (NO branch of block 730), charging is halted (block 740), and the operation returns to the step of block 720. The occurrence of such an event is unlikely because the onset of charging current reduction (block 735) occurs at the predetermined threshold temperature, which is 10% to 30% below the maximum operating temperature. Thus, in the examples provided herein, the predetermined threshold temperature may be 70 degrees C. for a maximum operating temperature of 85 degrees C.

In an exemplary embodiment, the step of block 735 may be performed by reducing the control pilot pulse duty cycle by a factor F, so that the duty cycle is changed from the current duty cycle D by multiplying D by (1−F), so that the new duty cycle is (1−F)D. F depends upon the present temperature sensed by the sensor 214. One example of how to define F is as follows:

$$F=(\text{present temp}-70 \text{ deg C.})/(85 \text{ deg C.}-70 \text{ deg C.}),$$

where "present temp" is the measured temperature from the sensor 214 in degrees C., 85 deg C. is the maximum operating temperature, and 70 deg C. is the predetermined threshold temperature. The skilled worker may use suitable definitions of F other than the foregoing.

Figure 16:
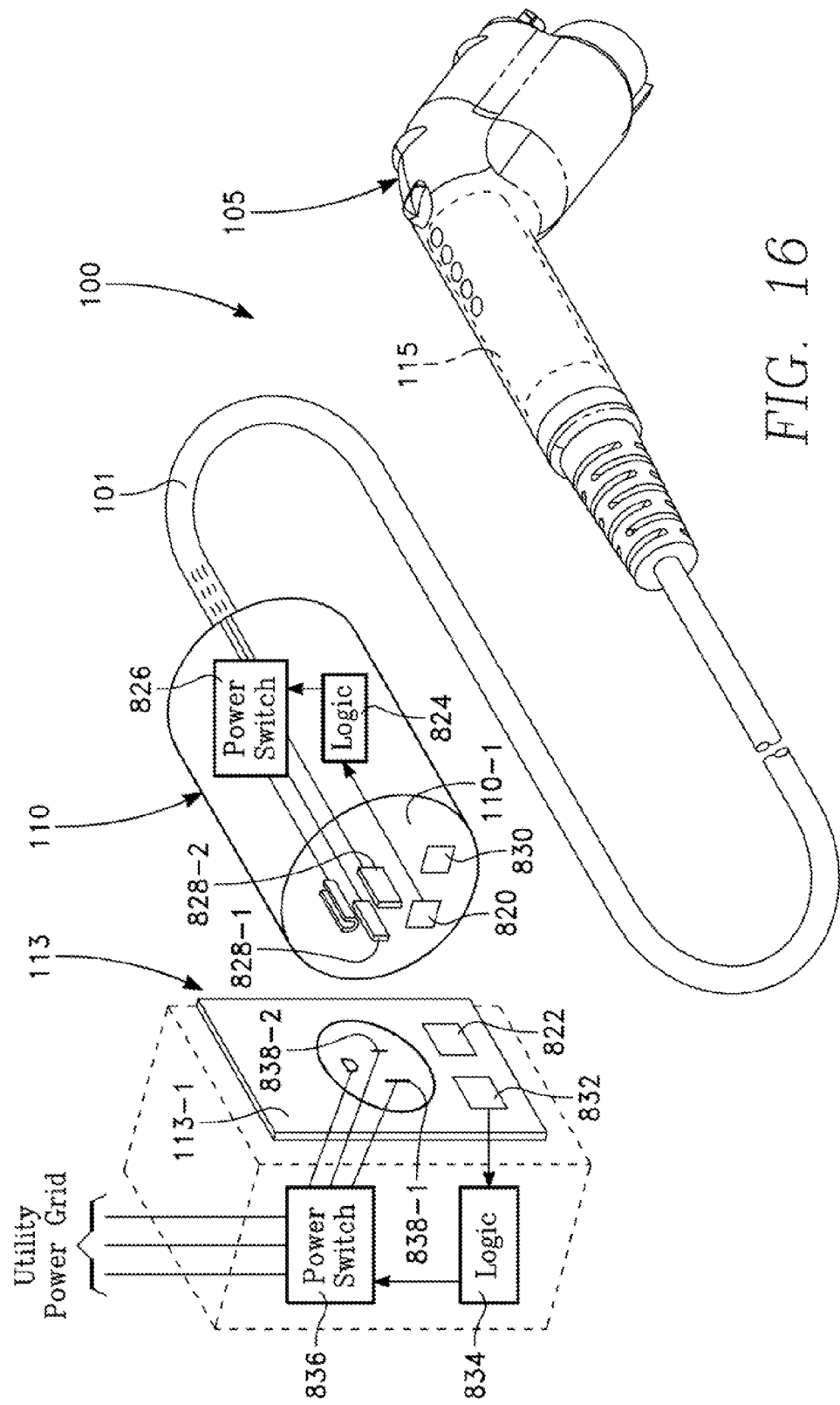
FIG. 16 depicts an embodiment of the EVSE kit including the docking connector with the embedded EVSE controller, in which proximity sensing between mating connectors is provided.

In accordance with a further embodiment, proximity sensing between the cable utility connector (plug) 110 and the A.C. power outlet 113 is provided. Referring to FIG. 16, the utility connector (plug) 110 has a sensor 820 on a receptacle-facing surface 110-1 of the utility connector (plug) 110. The power outlet 113 has an exciter 822 on a plug-facing surface 113-1 of the power outlet 113. The sensor 820 and the exciter 822 are in mutual registration whenever the plug 110 is engaged with the power outlet 113. The sensor 820 may be magnetic, electrical or optical, respectively, in which case the exciter 822 is a magnetic material, a conductor or an optically visible pattern, respectively, or any other suitable sensor-exciter pair. The output of the sensor 820 (e.g., a voltage signal) is connected to a logic circuit 824 provided within the plug 110. A power switch or contactor 826 within the plug 110 is connected between conductive prongs 828-1 and 828-2 of the plug 110 and the AC power conductors of the cable 101. The logic circuit 824 controls the power switch 826. The logic circuit 824 may be implemented so as to cause the power switch 826 to remain open unless or until the sensor 820 indicates that the exciter 822 is near the sensor 820. In one embodiment, the sensor 820 and exciter 822 are designed so that the sensor 820 produces a signal above a threshold recognized by the logic circuit 824 only when the plug 110 is fully inserted into the outlet 113.

The utility connector (plug) 110 has an exciter 830 on the receptacle-facing surface 110-1. The power outlet 113 has a sensor 832 on the plug-facing surface 113-1. The sensor 832 and the exciter 830 are in mutual registration whenever the plug 110 is engaged with the outlet 113. The sensor 832 may be magnetic, electrical or optical, respectively, in which case the exciter 830 is a magnetic material, a conductor or an optically visible pattern, respectively, or any other suitable sensor-exciter pair. The output of the sensor 832 (e.g., a voltage signal) is connected to a logic circuit 834 provided within or behind the outlet 113. A power switch or contactor 836 within or behind the outlet 113 is connected between conductive sockets 838-1 and 838-2 of the outlet 113 and AC power conductors furnishing A.C. power to the outlet 113 from a utility distribution panel (not shown). The logic circuit 834 controls the power switch 836. The logic circuit 834 may be designed or programmed so as to cause the power switch 836 to remain open unless or until the sensor 832 indicates that the exciter 830 is near the sensor 832. In one embodiment, the sensor 832 and exciter 830 are designed so that the sensor 832 produces a signal above a threshold recognized by the logic circuit 834 only when the plug 110 is fully inserted into the outlet 113.

Figure 17A:
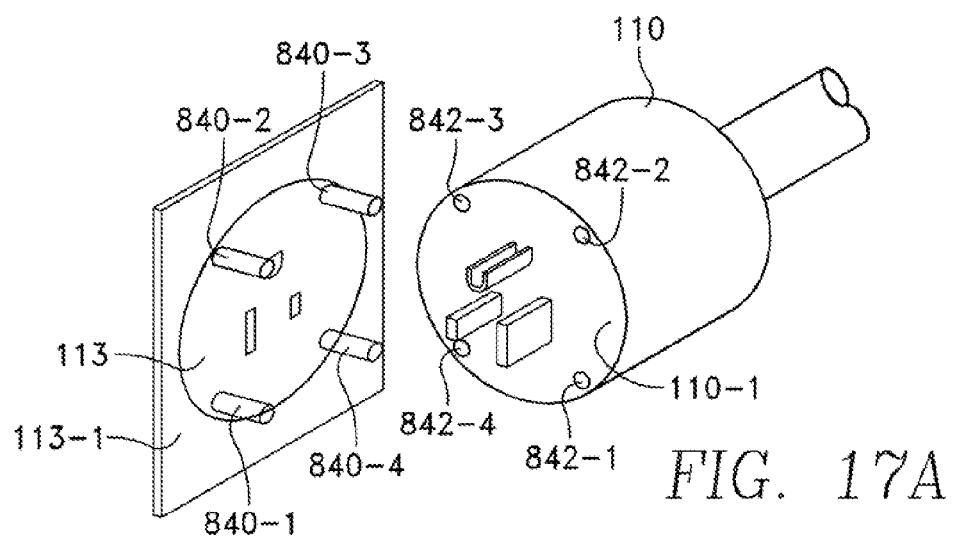
FIGS. 17A through 17C illustrate provision of mechanical barriers in the form of external posts and matching holes in opposing surfaces of the plug and outlet in the EVSE kit of FIG. 1, FIG. 2 or FIG. 6.

The power outlet 113 may be of a design that is optimized for use with the docking connector 105 containing the embedded EVSE controller 115. In a first embodiment, the plug 110 and the outlet 113 have mechanical barriers separate from the conductive prongs of the plug 110 or the conductive sockets of the power outlet 113. The mechanical barriers prevent connection of the plug 110 to any receptacle except the optimized power outlet 113, or prevent connection of the power outlet 113 to any plug except the optimized utility plug 110, or prevent both possibilities. These mechanical barriers are embodied as external posts and matching holes in opposing surfaces of the plug 110 and outlet 113. Referring to FIG. 17A, in a first embodiment the outlet 113 has one or more non-conductive posts 840-1 through 840-4 protruding from the plug-facing surface 113-1, while the plug 110 has one or more holes 842-1 through 842-4 matching and aligned with the posts 840-1 through 840-4. This feature prevents connection of any plug to the outlet 113 except the plug 110 containing the holes 842-1 through 842-4.

Figure 17B:
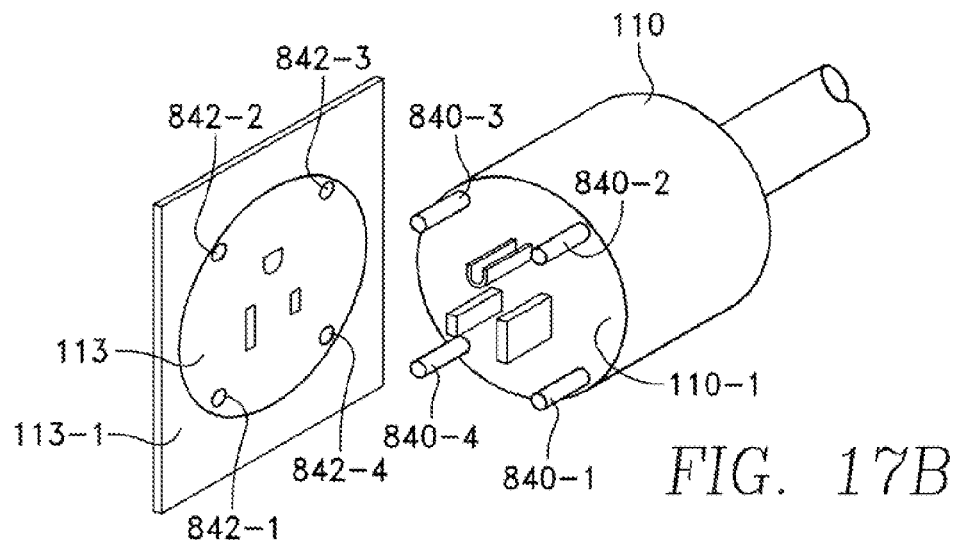

Referring to FIG. 17B, in a second embodiment the plug 110, which may meet a desired specification (e.g., NEMA 6-50), has one or more posts 840-1 through 840-4 protruding from the receptacle-facing surface 110-1, while the outlet 113 has one or more holes 842-1 through 842-4 matching and aligned with the posts 840-1 through 840-4. This feature prevents connection of the plug 110 to any receptacle except the outlet 113 containing the holes 842-1 through 842-4.

Figure 17C:
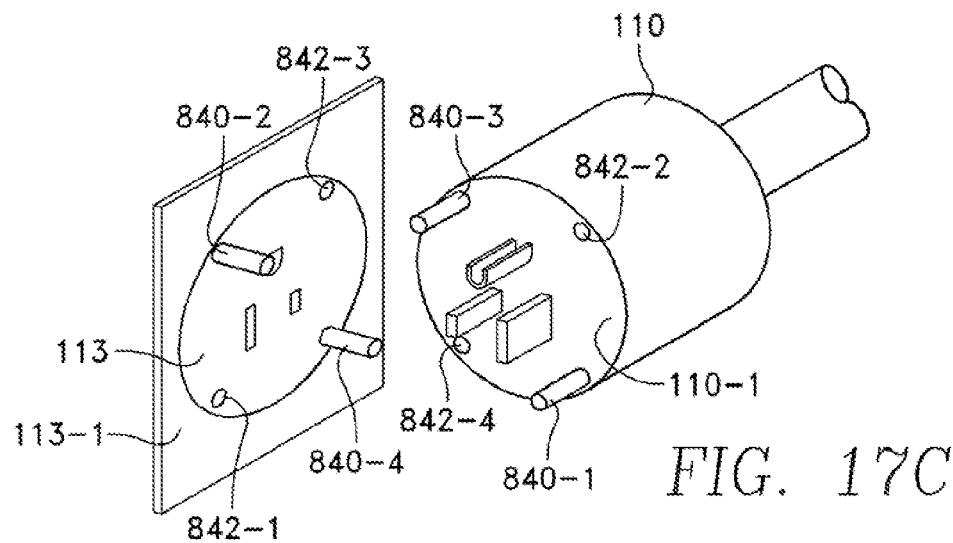

Referring to FIG. 17C, the plug 110 has posts 840-1 and 840-3 and holes 842-2 and 842-4, while the outlet 113 has holes 842-1 and 842-3 matching the posts 840-1 and 840-3 and posts 840-2 and 840-4 matching the holes 842-2 and 842-4. In the embodiment of FIG. 17C, only the optimized plug 110 and the optimized outlet 113 may be connected together.

In FIGS. 17A, 17B and 17C, the posts 840-1 through 840-4 are non-conductive and the holes 842-1 through 842-4 are formed in non-conductive materials.

Figure 18A:
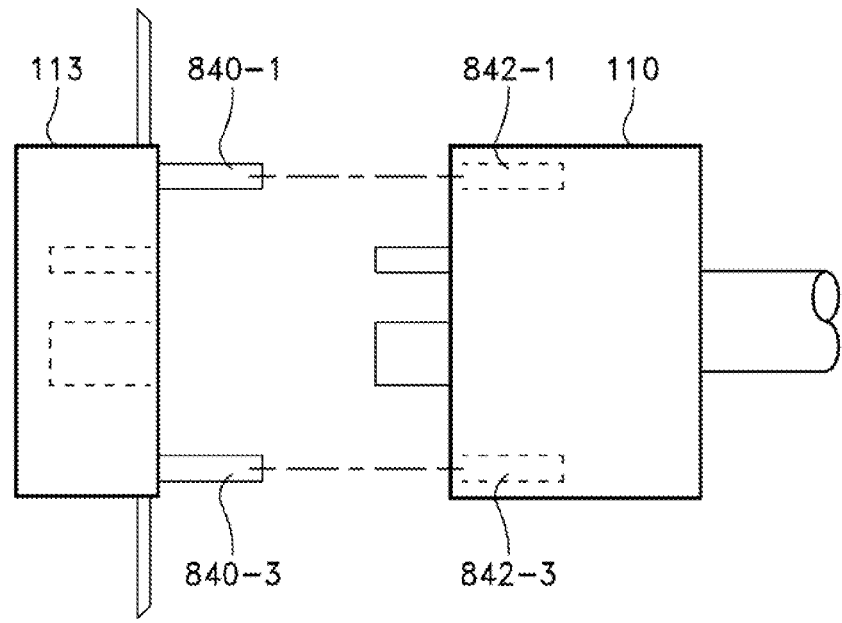
FIGS. 18A and 18B are side views depicting disengagement and engagement, respectively, of the plug and outlet of any one of FIGS. 17A-17C.
Figure 18B:
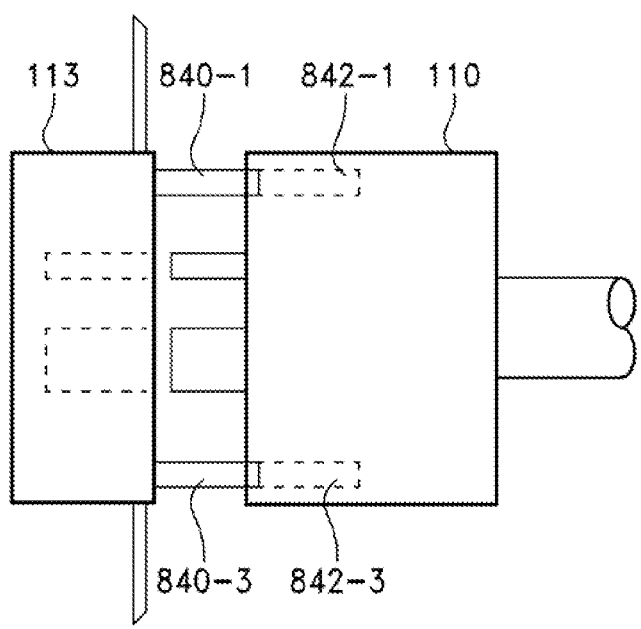
Figure 19A:
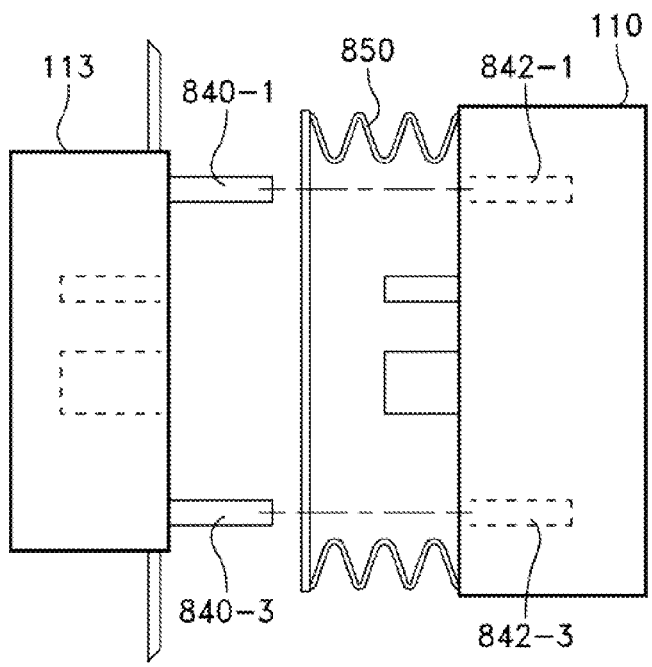
FIGS. 19A and 19B correspond to FIGS. 18A and 18B, and showing in addition of a flexible insulating skirt around the plug.
Figure 19B:
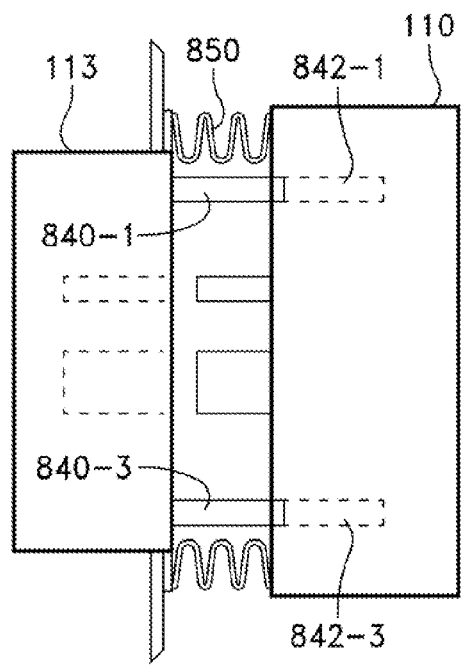

FIGS. 18A and 18B depict the insertion of the posts 840-1 through 840-4 into the holes 842-1 through 842-4, showing that the posts and holes engage before the conductive prongs of the plug 110 reach the conductive sockets of the outlet 113. This feature prevents electrical connection until proper alignment and registration between the posts and holes assures a safe connection. FIGS. 19A and 19B depict the insertion of the posts 840-1 through 840-4 into the holes 842-1 through 842-4, with an elastic insulating skirt 850 attached to the plug 110 and covering the protruding conductive prongs of the plug 110. The skirt 850 is compressed in the view of FIG. 19B as the plug 110 approaches the outlet 113, preventing accidental touching of the conductive prongs of the plug 110 during insertion into the outlet 113.

Figure 20:
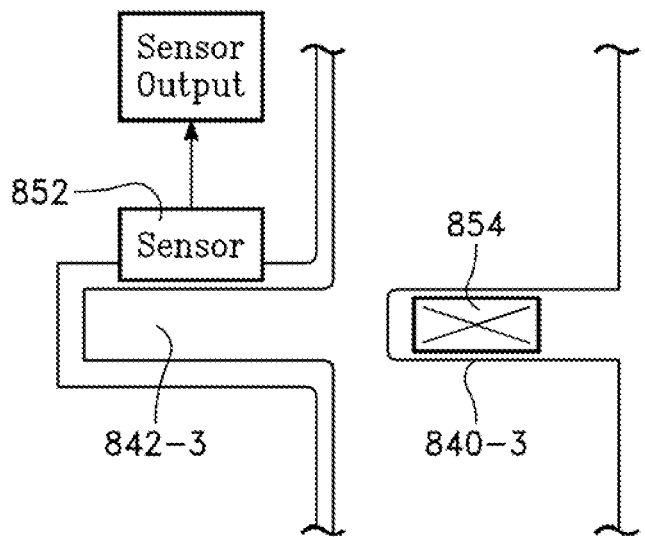
FIGS. 20 and 21 depict embodiments corresponding to FIGS. 17A through 17C with proximity sensing features including in-post sensors and exciters and in-hole sensors and exciters.
Figure 21:
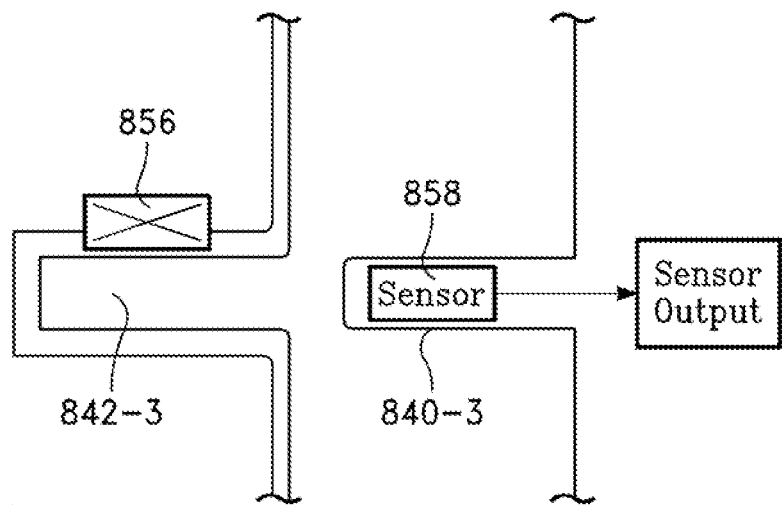

Referring to FIG. 20, an in-hole sensor 852 is provided in one of the holes of FIGS. 17A-17C (e.g., the hole 842-3), and an in-post exciter 854 is provided in the corresponding one of the posts of FIGS. 17A-17C (e.g., the post 840-3). This arrangement may be reversed, as depicted in FIG. 21, in which an in-hole exciter 856 is provided in one of the holes of FIGS. 17A-17C (e.g., the hole 842-3), while an in-post sensor 858 is provided in the corresponding one of the posts of FIGS. 17A-17C (e.g., the post 840-3). The sensor 852 or 858 may be a magnetic, electrical, optical or mechanical sensor, for example, in which case the corresponding exciter 852 or 856 may be, respectively, a permanent magnet, a conductor, an optical pattern or the post itself.

Figure 22:
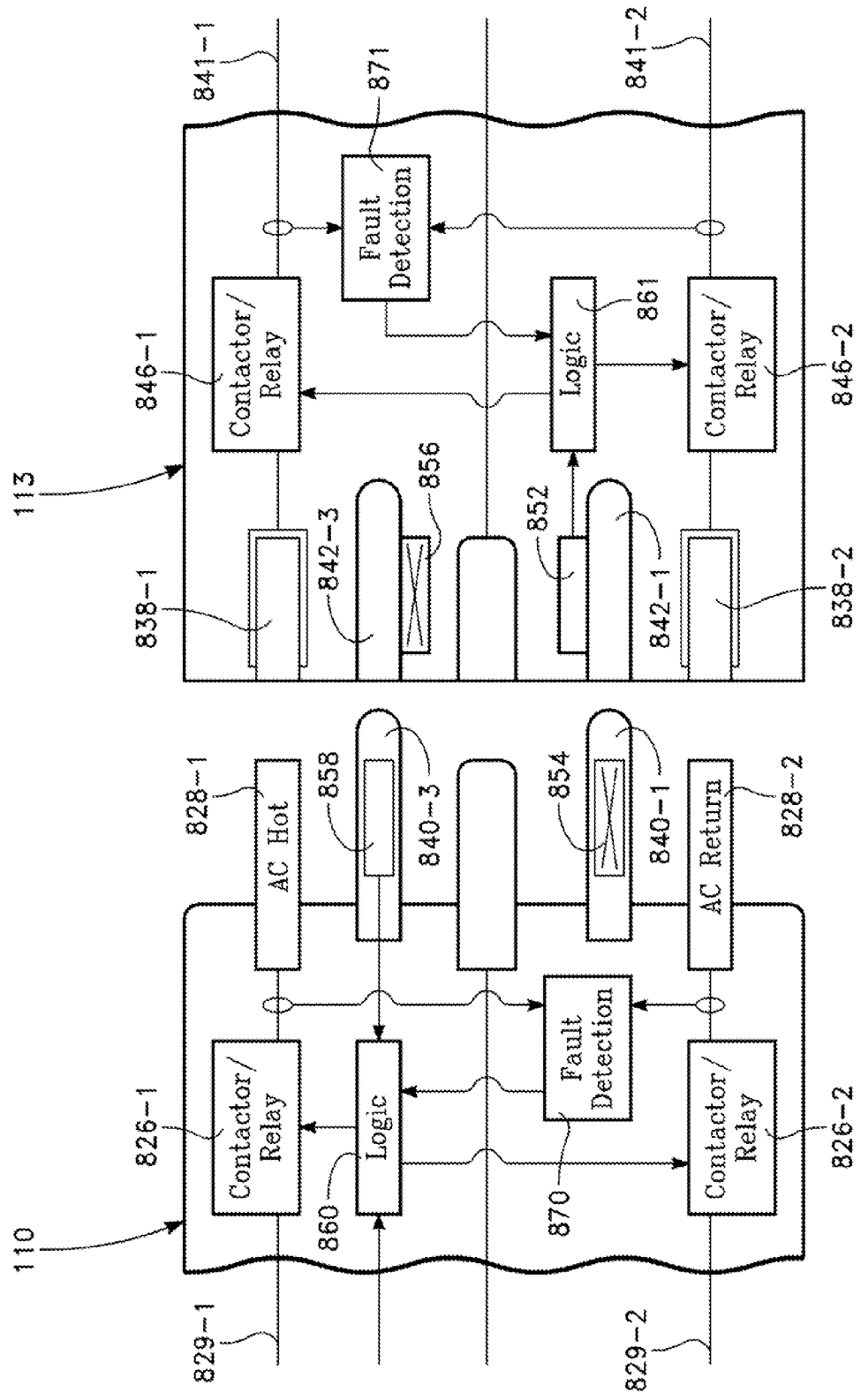
FIGS. 22 and 23 are schematic diagrams of respective embodiments of the EVSE kit incorporating the in-post and in-hole proximity sensing features of FIGS. 20 and 21.

FIG. 22 depicts how the sensors 852 and 858 and exciters 854 and 856 of FIGS. 20 and 21 can provide control over electrical power based upon the insertion position of the plug 110 relative to the outlet 113. As shown in FIG. 22, the plug 110 has non-conductive posts 840-1 and 840-3, while the outlet 113 has non-conductive holes 842-1 and 842-3 that are configured to receive the posts 840-1 and 840-3, respectively. AC power prongs 828-1 and 828-2 of the plug 110 are connected to respective power conductors 829-1 and 829-2 of the cord 101 through respective power switches or contactors 826-1 and 826-2 within the plug 110. The post 840-3 of FIG. 22 has the in-post sensor 858. The matching hole 842-3 in the power outlet 113 has the in-hole exciter 856. A logic circuit 860 has an input connected to the in-post sensor 858. The logic circuit 860 controls the contactors 826-1 and 826-2 and is designed or programmed to maintain the contactors 826-1 and 826-2 open unless or until the sensor 858 provides a predetermined signal indicative of an alignment between the sensor 858 and the exciter 856. In one embodiment, the sensor 858 and exciter 856 are designed so that the sensor 858 produces a predetermined signal (e.g., a voltage above a certain threshold) recognized by the logic circuit 860 only when sensor 858 and exciter 856 are adjacent and aligned with one another. The location of the sensor 858 and exciter 856 is such that the predetermined signal is produced only when the plug 110 is fully inserted into the outlet 113.

As shown in FIG. 22, the hole 842-1 of the power outlet 113 has the in-hole sensor 852 while the corresponding post 840-1 in the plug 110 has the in-post exciter 854. The outlet 113 has conductive sockets 838-1 and 838-2 configured to receive the prongs 828-1 and 828-2, respectively. The conductive sockets 838-1 and 838-2 are connected to respective power conductors 841-1 and 841-2 (from a utility distribution panel not shown) through respective power switches or contactors 846-1 and 846-2. In FIG. 22, the hole 842-1 of the outlet 113 has the in-hole sensor 852. The matching post 840-1 of the plug 110 has the in-post exciter 854. A logic circuit 861 of the outlet 113 has an input connected to the in-hole sensor 852. The logic circuit 861 controls the contactors 846-1 and 846-2 and is designed or programmed to maintain the contactors 846-1 and 846-2 open unless or until the sensor 852 provides a predetermined signal indicative of an alignment between the sensor 852 and the exciter 854. In one embodiment, the sensor 852 and exciter 854 are designed so that the sensor 852 produces a predetermined signal (e.g., a voltage above a certain threshold) recognized by the logic circuit 861 only when the sensor 852 and the exciter 854 are adjacent and aligned with one another. The location of the sensor 852 and exciter 854 is such that the predetermined signal is produced only when the plug 110 is fully inserted into the outlet 113.

Figure 23:
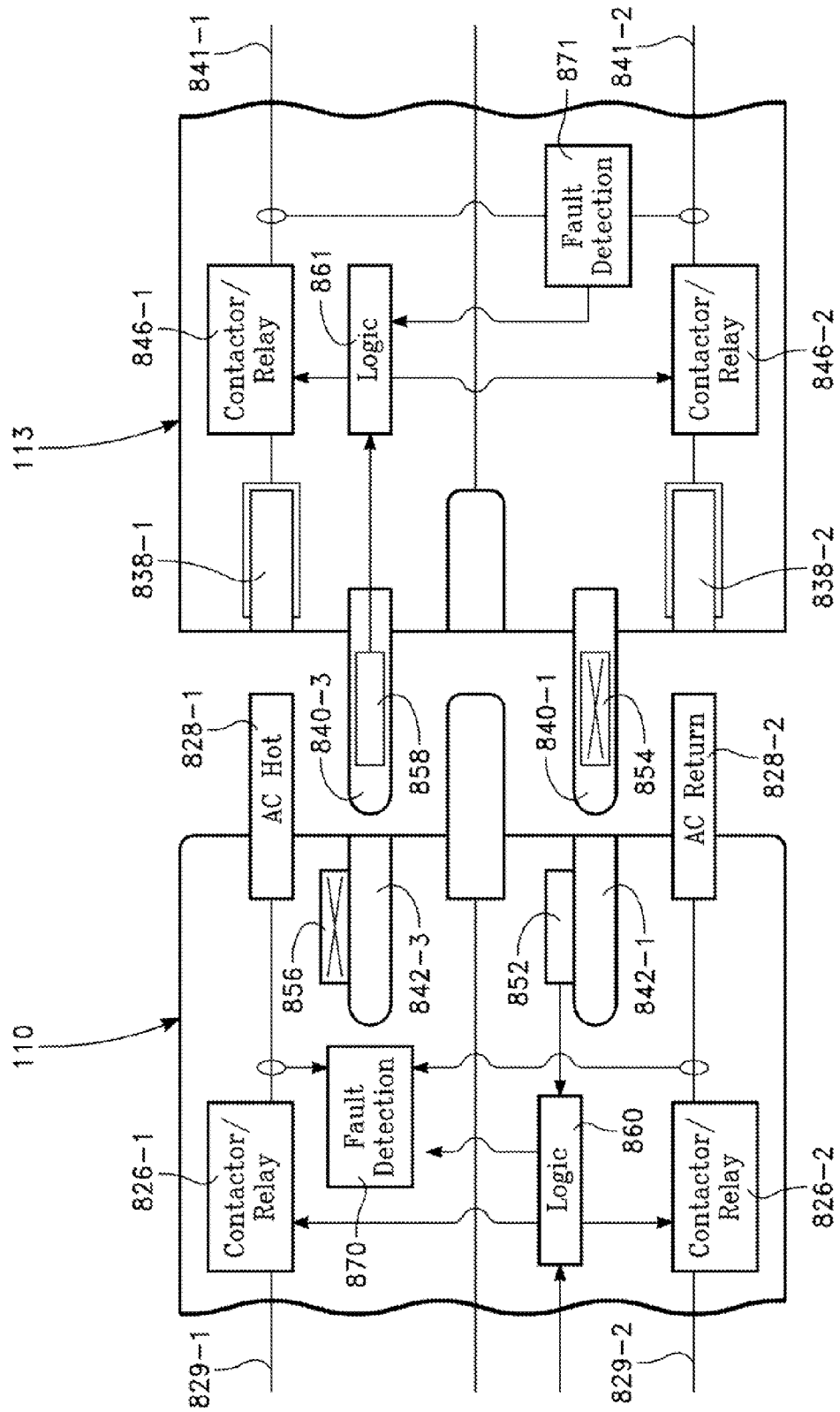

FIG. 23 illustrates a modification of the embodiment of FIG. 22, in which the post 840-1 with the in-post exciter 854 and the post 840-3 with the in-post sensor 858 are provided on the outlet 113 rather than the plug. Furthermore, in the embodiment of FIG. 23 the hole 842-1 with the in-hole sensor 852 and the hole 842-3 with the in-hole exciter 856 are provided in the plug 110 rather than the outlet 113.

The features of FIGS. 16 through 17C and 20-22 have been described being incorporated into the plug 110 and the outlet 113. In addition, the features of FIGS. 16-17C and 20-22 may be incorporated into the barrel electrical connector 105-3 of FIG. 1 or FIG. 2 and into the cable electrical connector 102 of FIG. 1 or FIG. 2. In such a case, for example, the barrel electrical connector 105-3 of FIG. 2 would contain the features of the plug 110 of FIG. 22 (or of FIG. 23), and the cable electrical connector 102 of FIG. 2 would contain the features of the outlet 113 of FIG. 35 (or of FIG. 36). Alternatively, the barrel electrical connector 105-3 of FIG. 1 would contain the features of the outlet 113 FIG. 22 (or of FIG. 23), and the cable electrical connector 102 of FIG. 1 would contain the features of the plug 110 of FIG. 35 (or of FIG. 36).

FIGS. 24A and 24B depict one embodiment of an electrical version of the in-post exciter 854 and in-hole sensor 852, of which FIG. 24A depicts the assembly prior to post-hole insertion and FIG. 24B depicts the assembly upon post-hole insertion. The in-post exciter 854 is a conductive band, while the in-hole sensor 852 is provided as a pair of conductive contacts that form a closed circuit upon post-hole insertion.

FIGS. 25A and 25B depict another embodiment of an electrical version of the in-hole exciter 856 and in-post sensor 858. The in-hole exciter 856 is a conductive band, while the in-post sensor 858 is provided as a pair of conductive contacts that form a closed circuit upon post-hole insertion.

FIGS. 26A and 26B depict a further embodiment of an electrical version of the in-hole exciter 856 and in-post sensor 858. The in-hole exciter 856 is a pair of conductive bands held at different voltages, while the in-post sensor 858 is provided as a pair of conductive contacts that transmit that voltage difference to a logic circuit whenever the two sets of contacts are in mutual engagement upon post-hole insertion.

FIGS. 27A and 27B depict an embodiment in which the in-hole sensor 852 is a spring-loaded end-of-travel sensor actuated by the distal end of the post upon complete plug insertion.

FIGS. 28A and 28B depict an embodiment in which the in-post sensor 858 is a magnetic sensor such as a coil or a magnetically-actuated relay, while the in-hole exciter 856 is a magnet or permanent magnet.

FIGS. 29A and 29B depict an embodiment in which the in-hole sensor 852 is a magnetic sensor such as a coil or a magnetically actuated relay while the in-post exciter 854 is a magnet or permanent magnet.

FIGS. 30A and 30B depict an embodiment in which the in-hole sensor 852 is an optical sensor or image array, while the in-post exciter 854 is an optical pattern that stimulates a predetermined output from the sensor 852 only when the post is fully inserted as in FIG. 30B.

FIGS. 31A and 31B depict an embodiment in which the in-post sensor 858 is an optical sensor or image array, while the in-hole exciter 856 is an optical pattern that stimulates a predetermined output from the sensor 858 only when the post is fully inserted as in FIG. 31B.

Referring again to FIGS. 22 and 23, a ground fault interrupt (GFI) capability may be included in the plug 110 by providing a ground fault detector 870 in the plug 110. The detector 870 has two inputs connected to the two prongs 828-1 and 828-2 of the plug 110. The output of the fault detector 870 is connected to an input of the logic circuit 860. The logic circuit 860 is designed or programmed to open the contactors or switches 826-1 and 826-2 if the fault detector 870 issues a fault indication, or if one of the in-hole or in-post sensors does not register full engagement of the plug 110 with the outlet 113. Alternatively, the fault detector 870 and the logic circuit 860 may be provided in the plug 110 without the in-hole sensors or exciters and in-post sensors and exciters.

As shown, in FIGS. 22 and 23, a ground fault interrupt (GFI) capability may be included in the outlet 113 by providing a ground fault detector 871 in or with the outlet 113. The detector 871 has two inputs connected to the two AC power conductors 841-1 and 841-2 from the utility distribution panel (not shown). The output of the fault detector 871 is connected to an input of the logic circuit 861. The logic circuit 861 is designed or programmed to open the contactors or switches 846-1 and 846-2 if the fault detector 871 issues a fault indication, or if one of the in-hole or in-post sensors does not register full engagement of the plug 110 with the outlet 113. Alternatively, the fault detector 871 and the logic circuit 861 may be provided in the outlet. 113 without the in-hole sensors or exciters and in-post sensors and exciters.

Figure 32:
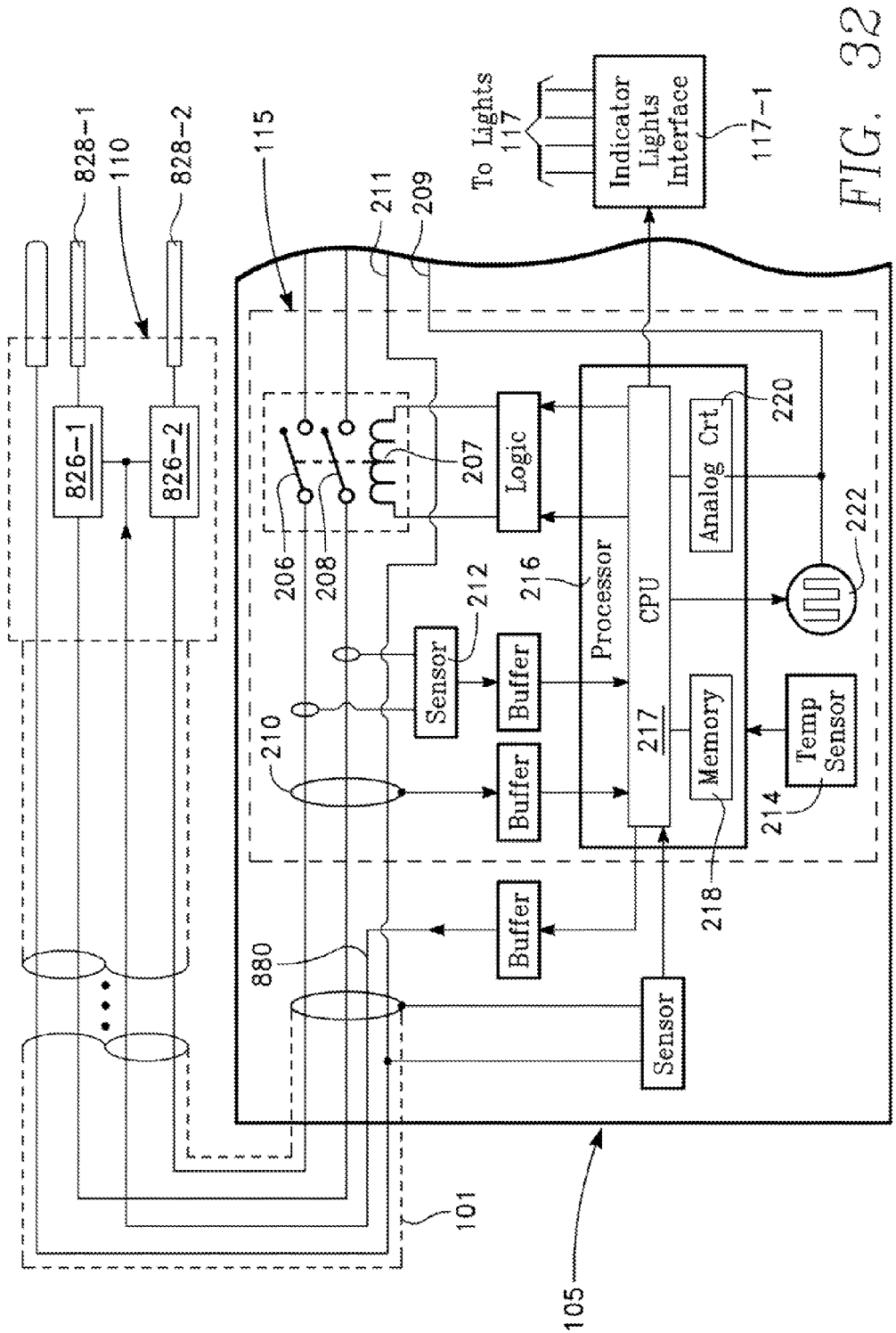
FIG. 32 is a schematic diagram of an embodiment of the EVSE kit having ground fault detection and interruption control elements distributed between the plug and the embedded EVSE controller in the docking connector.

FIG. 32 depicts a distributed ground fault interrupt (GFI) feature for the plug 110, in which the principal components required for GFI are located in the docking connector 105 (i.e., in the embedded EVSE controller 115), and only the contactors 826-1 and 826-2 are contained in the plug 110. This minimizes the contents and size of the plug 110. The distributed GFI feature for the plug 110 of FIG. 32 utilizes the GFI detection capability of the embedded EVSE controller 115 described above to control the contactors 826-1 and 826-2 in the plug 110. For this purpose, an insulated signal path conductor 880 is provided through the length of the cable 101. The signal path conductor 880 carries an interrupt command signal from the processor 216 of the embedded EVSE controller 115 to the contactors 826-1 and 826-2 in the plug 110. The processor 216 in the embodiment of FIG. 32 is programmed to issue an interrupt command signal whenever the sensor 212 in the embedded EVSE controller 115 detects a ground fault.

Figures 33, 34:
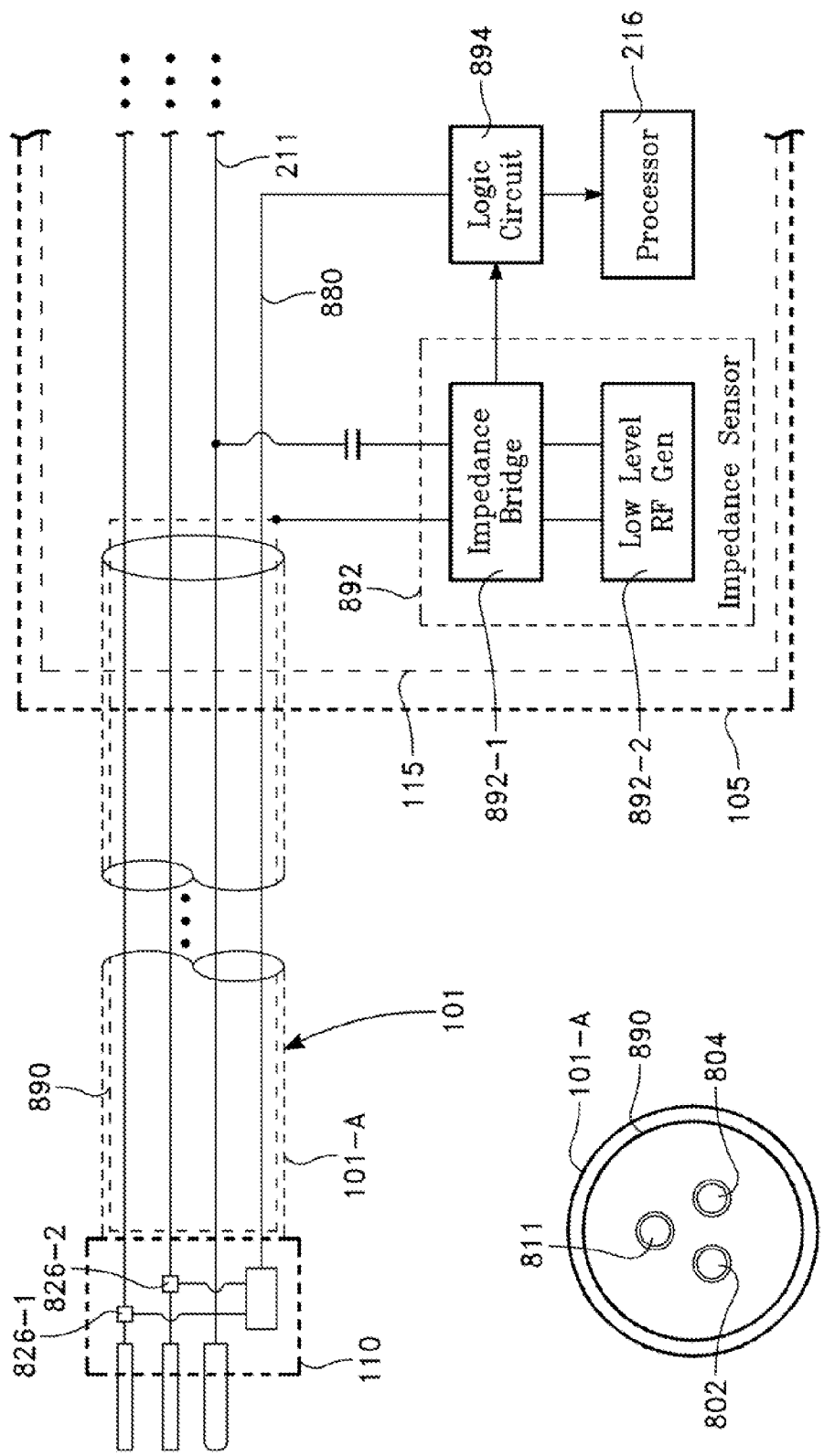
FIG. 33 is a schematic diagram of an embodiment of the EVSE kit having a conductive sheath in the cable and a sheath sensor in the embedded EVSE controller for sensing penetration of the sheath in which the sheath sensor is an RF impedance sensor.
FIG. 34 is a cross-sectional end-view of the cable in the embodiment of FIG. 33.

Referring to FIGS. 33 and 34, the cable 101 has a conventional outer cover 101-A. A cylindrical sheath 890 is contained under the outer cover 101-A. The sheath 890 preferably extends the entire length of the cable 101 and surrounds the electrical conductors of the cable 101, and may be formed of a thin conductive material such as a metal foil, for example. A sensor 892 within the embedded EVSE controller 115 is attached to the sheath 890. The sensor 892 may be of any suitable type adapted to sense a change in a characteristic of the sheath indicative of a tear or penetration of the sheath 890. The output of the sensor 892 is connected to a logic circuit 894 whose output is connected to the processor 216. In the embodiment of FIG. 33, the processor 216 is programmed to open the contactors 206 and 208 (shown in FIG. 32) in response to the output of the sensor 892. Alternatively, or in addition, the output of the logic circuit 894 may be connected through the signal path conductor 880 of FIG. 32 to the contactors 826-1 and 826-2 in the plug 110, so that power flow through the plug 110 is interrupted whenever the integrity of the sheath 890 is violated.

In FIG. 33, the sensor 892 senses changes in RF impedance of the sheath 890 with reference to the neutral conductor in the cable 101. In one implementation, the sensor 892 may consist of an impedance bridge 892-1 connected to a low level RF generator 892-2, one node of the impedance bridge 892-1 being the sensor output connected to the logic circuit 894.

Figure 35:
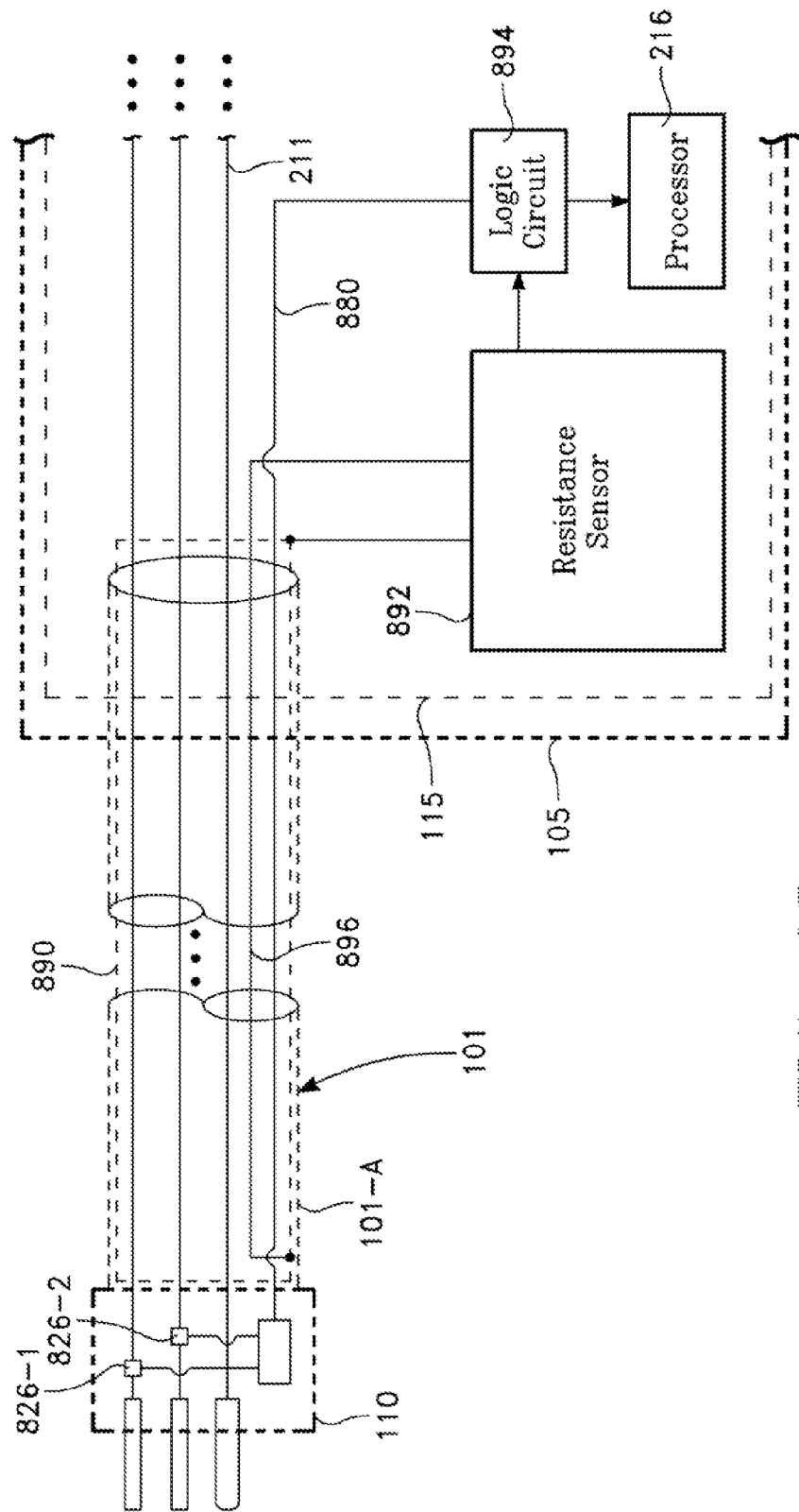
FIG. 35 depicts an embodiment in which the sheath sensor is an electrical resistance sensor.

In the embodiment of FIG. 35, the sensor 892 senses the electrical resistance between the two ends of the sheath 890. In FIG. 35, the sensor 892 is connected to the end of the sheath 890 at the embedded EVSE controller 115. An insulated return conductor 896 within the cable 101 is attached to the end of the sheath 890 at the plug 110, and extends through the cable 101 back to the sensor 892. This enables the sensor 892 to measure DC resistance along the length of the sheath 890.

Figure 36:
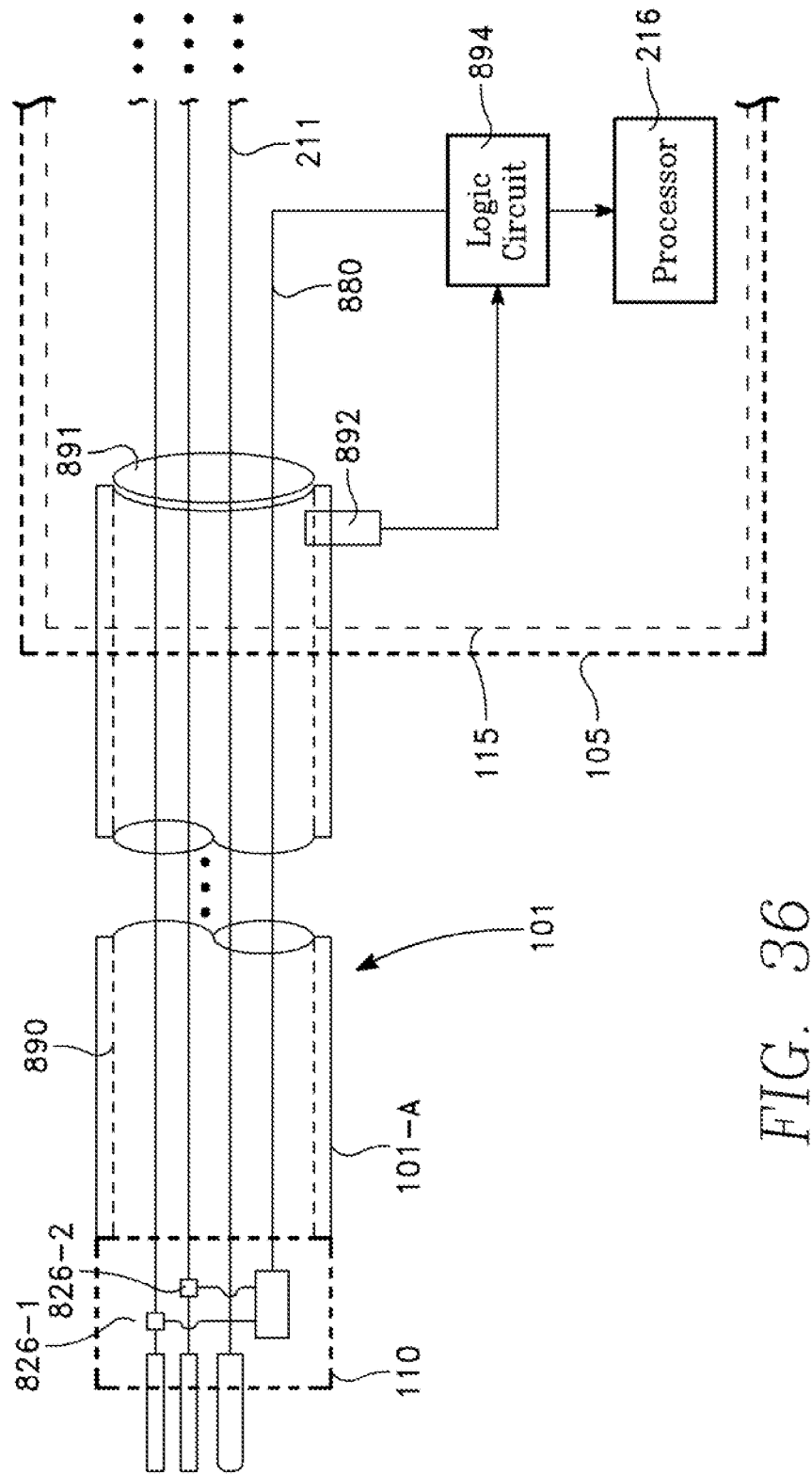
FIG. 36 depicts an embodiment in which the sheath sensor is a gas pressure sensor.

In the embodiment of FIG. 36, the sensor 892 senses air pressure inside the sheath 890. In this case, the sheath 890 forms a sealed (air tight) enclosure, and its interior volume is initially pressurized to a predetermined pressure exceeding atmospheric pressure. The logic circuit 894 responds to an indication by the sensor 892 of a loss of pressure inside the sheath 890, indicating violation of the integrity of the sheath 890. The sheath 890 is sealed at each of its two ends, namely at the end near the plug 110 and at the end terminated at the embedded EVSE controller 115. For example, an end cap 891 seals the end of the sheath 890 at the embedded EVSE controller 115.

In the embodiments of FIGS. 33 through 36, the logic circuit 894 is designed or programmed to respond to changes in a characteristic of the sheath 890 (e.g., such as electrical resistance, RF impedance, internal pressure or other characteristic) beyond a threshold change and/or exceeding a threshold rate of change, for example.

The proximity detection embodiments of FIG. 16, the insulating post embodiments of FIGS. 17A-17C, the in-post sensor embodiments of FIGS. 20-23, the distributed GFI embodiment of FIG. 32 and the in-cable conductive sheath embodiments of FIGS. 33-34 may be combined with in suitable combinations with the embodiments of FIGS. 1-8 and/or in suitable combinations with one another.

Figure 37:
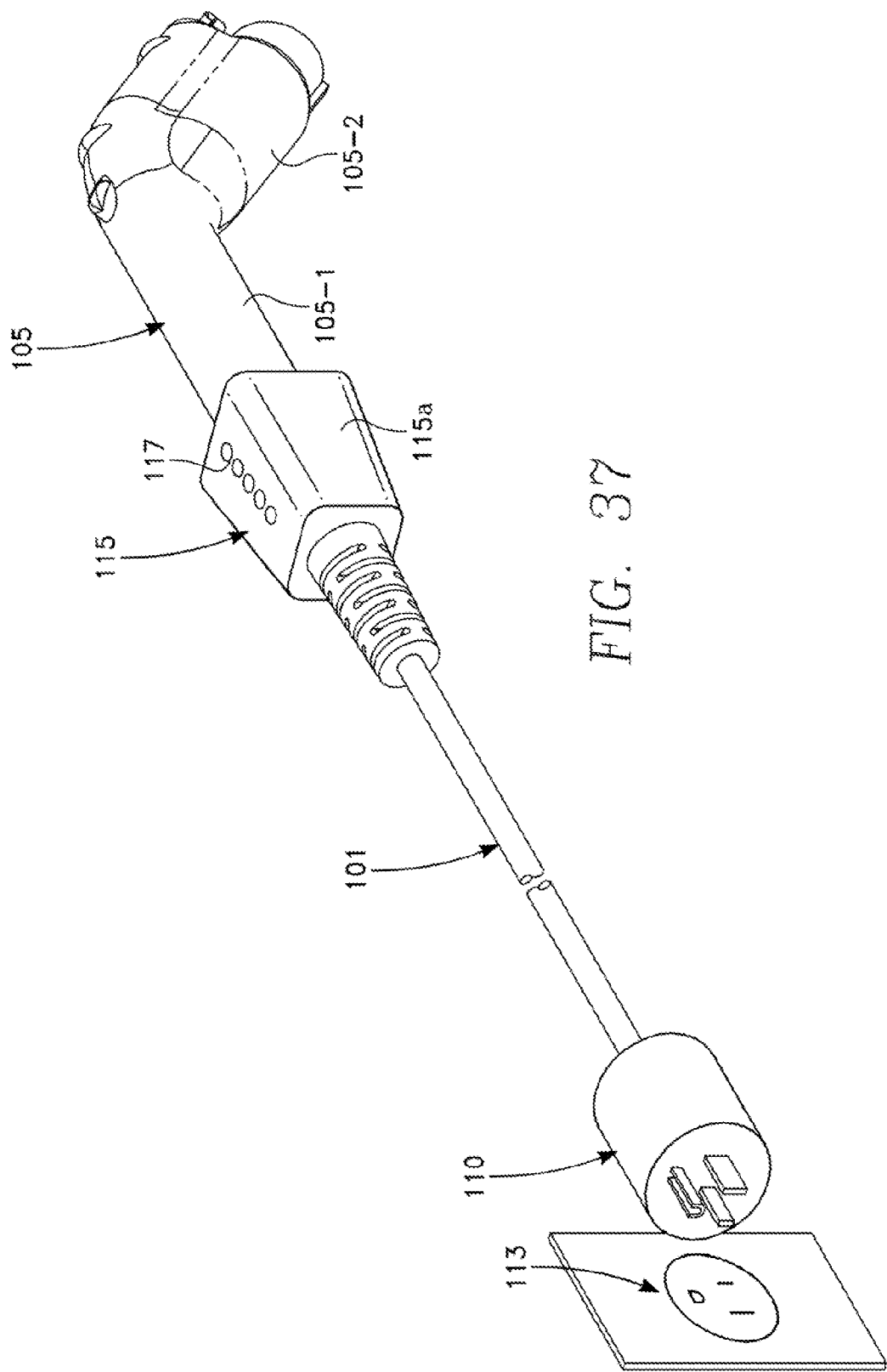
FIG. 37 depicts an embodiment in which the EVSE controller 115 is mounted on the end of the docking connector handle.

FIG. 37 depicts an embodiment in which the EVSE controller 115 of FIG. 4 is contained in a housing 115a mounted on one end of the docking connector handle 105-1. The EVSE controller 115 is electrically connected to the docking connector 105 without an intervening external cable. In the embodiment of FIG. 37, the power cord 101 is connected to the EVSE controller 115 in the manner depicted in FIG. 7. The external lights 117 are provided on the EVSE housing 115a.

Figure 38:
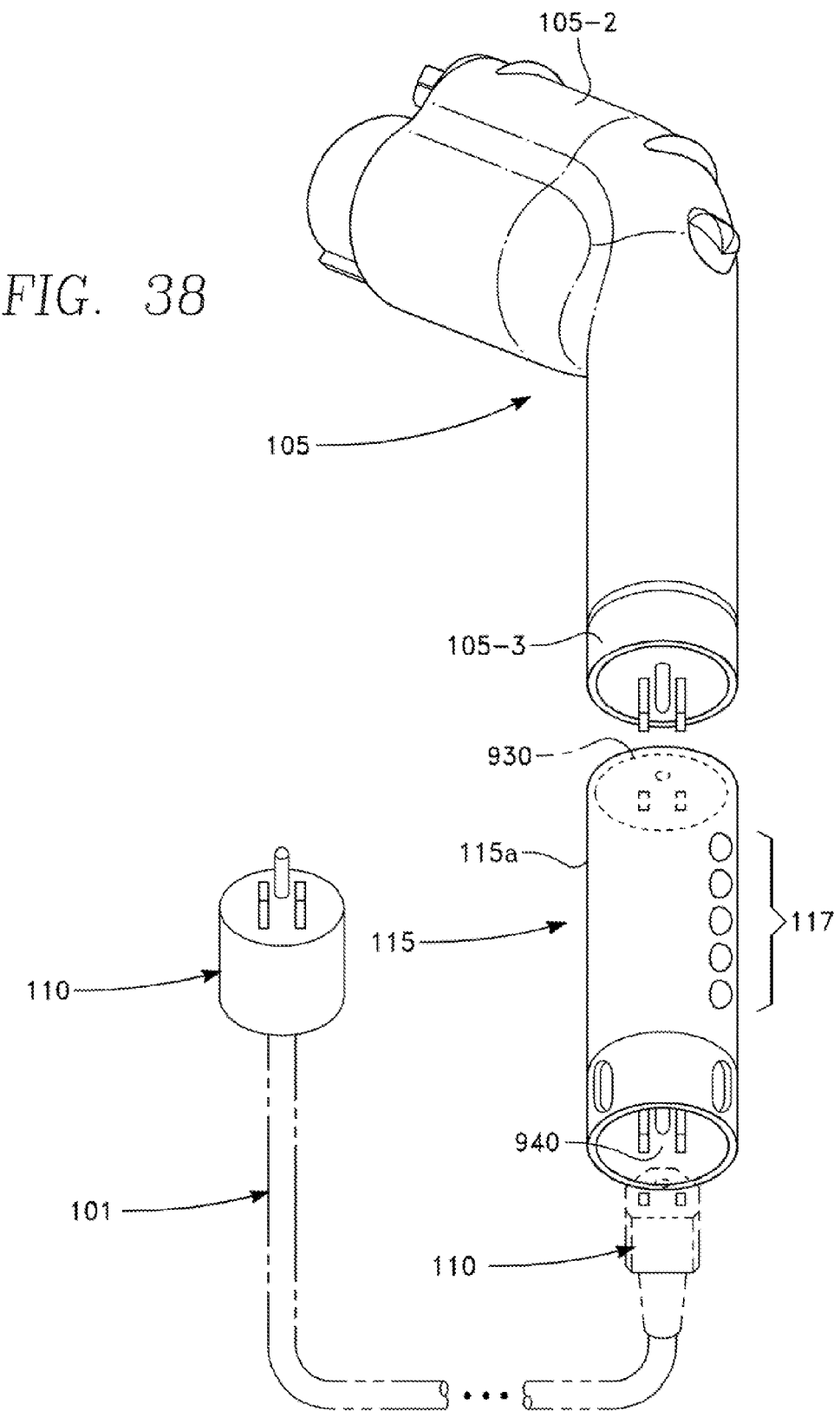
FIG. 38 depicts a modification an embodiment in which the EVSE controller is a module removably connectable at one end to the docking handle barrel and at the other end to the power cord.

FIG. 38 depicts a modification of the embodiment of FIG. 37, in which the housing of the EVSE controller 115 is a module having a pair of opposing module ends 930 and 940. The module end 930 has a female electrical connector removably engagable with a male electrical connector provided in the end 105-3 of the docking connector barrel 105-2. The module end 940 has male electrical connector removably engagable with a female electrical connector 110' provided on one end of the power cord 101. In another embodiment, the locations of the male and female electrical connectors are reversed with respect to the arrangement depicted in FIG. 38.

Figure 39:
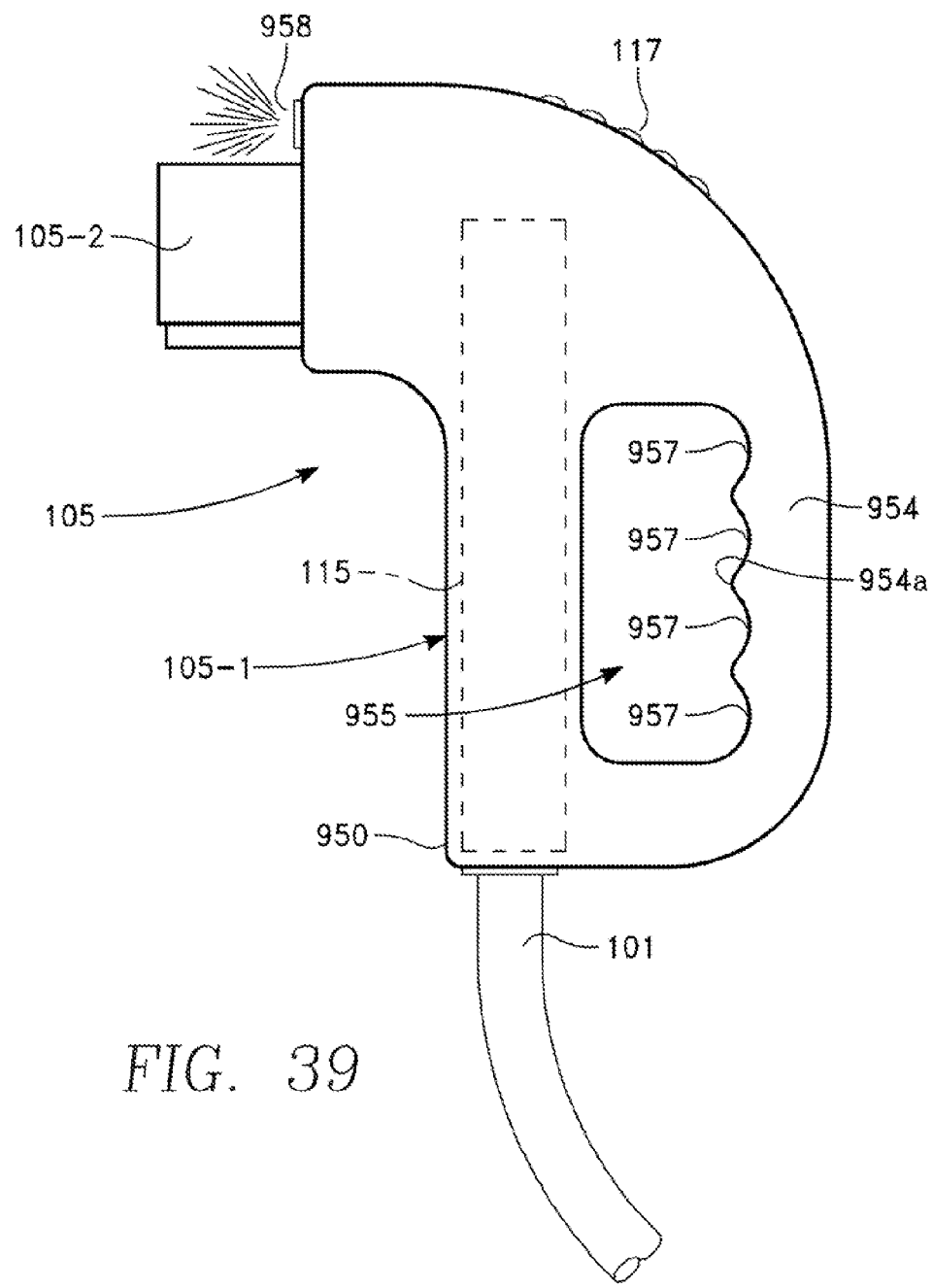
FIG. 39 is a plan view of a version of the docking connector having an enclosed hand-grip.

FIG. 39 is a plan view of a version of an embodiment of the docking connector 105 having an enclosed hand-grip. In the embodiment of FIG. 39, the docking connector 105 has a barrel 105-1 connected at an outer end 105-3 to the power cable 101, and a head 105-2 extending at an angle from the barrel 105-1. A rounded hand-grip 954 extends from the barrel 105-1, and a gripping space 955 is defined between the hand-grip 954 and the barrel 105-1. Finger rests 957 are provided in a surface 954a of the hand-grip 954 facing the gripping space 955. The docking connector head 105-2 of FIG. 39 may include a night light 958 to illuminate the EV charging port 107. The external lights 117 are provided on a surface near the barrel 105-1 and/or near the hand-grip 954.

While the foregoing is directed to embodiments of the present invention, other and further embodiments of the invention may be devised without departing from the basic scope thereof, and the scope thereof is determined by the claims that follow.

What is claimed is:

1. An electric vehicle supply equipment (EVSE) kit for charging an electric vehicle through a charging port of the electric vehicle, comprising:
   a docking connector comprising:
      a head having a head end engagable with the charging port of the electric vehicle;
      a barrel comprising a barrel docking end and a barrel cable end, said barrel docking end attached to said head;
      a first plurality of conductors extending into said barrel from said barrel cable end and a second plurality of conductors extending into said head from said head end;
      an embedded EVSE controller inside said docking connector connected between said first and second pluralities of conductors; and
      wherein the EVSE controller is configured to:
         monitor a sensed utility supply voltage;
         determine whether the sensed utility voltage is closer to a first level or a second level;
         establish an allowable voltage range based upon which level is determined for the sensed utility voltage;
         set a maximum current limit in accordance with the allowable voltage range based upon a predetermined correlation;
         adjust a control pilot pulse duty cycle to a level corresponding the maximum current limit;
         monitor a current flow and the sensed utility voltage;
         generate a fault alarm and trouble code if the current flow is above the maximum current limit; and
         generate a fault alarm and trouble code if the sensed voltage utility voltage deviates outside the allowable range.

2. The EVSE kit of claim 1, wherein the EVSE controller is further configured to:
   a) perform a handshake with the electric vehicle using a prescribed handshake protocol via a control pilot conductor after a docking connector has been inserted into the charging port of the EV;
   b) set the duty cycle of the control pilot generator to a predetermined maximum allowable current draw;
   c) compare a sample of a present temperature inside the EVSE to a predetermined threshold temperature;
   d) allow the predetermined maximum allowable current draw if the sample of the present temperature inside the EVSE is below the predetermined threshold temperature;
   e) compare the sample of the present temperature inside the EVSE with a maximum allowable operating temperature;
   f) reduce the duty cycle by a factor proportional to at least one of: (1) either the ratio between the sample of the present temperature and the maximum allowable operating temperature; or (2) the difference between the sample of the present temperature and the maximum allowable operating temperature if the sample of the present temperature is less than the maximum operating temperature; and
   g) halt charging if the sample of the measured temperature exceeds the maximum operating temperature.

3. An electric vehicle supply equipment (EVSE) kit for charging an electric vehicle through a charging port of the electric vehicle, comprising an EVSE controller configured to:

a) monitor a sensed utility supply voltage;
b) determine whether the sensed utility voltage is closer to a first level or a second level;
c) establish an allowable voltage range based upon which level is determined for the sensed utility voltage;
d) set a maximum current limit in accordance with the allowable voltage range based upon a predetermined correlation;
e) adjust a control pilot pulse duty cycle to a level corresponding the maximum current limit;
f) monitor a current flow and the sensed utility voltage;
g) generate a fault alarm and trouble code if the current flow is above the maximum current limit; and
h) generate a fault alarm and trouble code if the sensed voltage utility voltage deviates outside the allowable range.

4. The EVSE kit of claim 3, wherein the EVSE controller is configured to establish an allowable voltage range of ±10%.

5. The EVSE kit of claim 4 wherein the first level is 120 VAC, and the second level is 240 VAC.

6. A method for an electric vehicle supply equipment (EVSE) controller in an EVSE kit for charging an electric vehicle through a charging port of the electric vehicle, the method comprising:
a) monitoring a sensed utility supply voltage;
b) determining whether the sensed utility voltage is closer to a first level or a second level;
c) establishing an allowable voltage range based upon which level is determined for the sensed utility voltage;
d) setting a maximum current limit in accordance with the allowable voltage range based upon a predetermined correlation;
e) adjusting the control pilot pulse duty cycle to a level corresponding the maximum current limit;
f) monitoring a current flow and the sensed utility voltage;
g) generating a fault alarm and trouble code if the current flow is above the maximum current limit; and
h) generating a fault alarm and trouble code if the sensed voltage utility voltage deviates outside the allowable range.

7. The method of claim 6, wherein the EVSE controller is configured to establish an allowable voltage range of ±10%.

8. The method of claim 7 wherein the first level is 120 VAC, and the second level is 240 VAC.

9. An electric vehicle supply equipment (EVSE) kit for charging an electric vehicle (EV) through a charging port of the electric vehicle, comprising an EVSE controller configured to:
a) perform a handshake with the electric vehicle using a prescribed handshake protocol via a control pilot conductor after a docking connector has been inserted into the charging port of the EV;
b) set the duty cycle of the control pilot generator to a predetermined maximum allowable current draw;
c) compare a sample of a present temperature inside the EVSE to a predetermined threshold temperature;
d) allow the predetermined maximum allowable current draw if the sample of the present temperature inside the EVSE is below the predetermined threshold temperature;
e) compare the sample of the present temperature inside the EVSE with a maximum allowable operating temperature;
f) reduce the duty cycle by a factor proportional to at least one of: (1) either the ratio between the sample of the present temperature and the maximum allowable operating temperature; or (2) the difference between the sample of the present temperature and the maximum allowable operating temperature if the sample of the present temperature is less than the maximum operating temperature; and
g) halt charging if the sample of the measured temperature exceeds the maximum operating temperature.

10. The EVSE kit of claim 9, wherein the predetermined threshold temperature is 70 degrees C. and the maximum operating temperature is 85 degrees C.

11. The EVSE kit of claim 10, wherein reducing the duty cycle is performed by reducing the control pilot pulse duty cycle by a factor F, so that the duty cycle is changed from the current duty cycle D by multiplying D by (1-F), wherein F depends upon the present temperature.

12. The EVSE kit of claim 11, wherein F is the sample of the present temperature less the predetermined threshold temperature, divided by, the maximum operating temperature less the predetermined threshold temperature.

13. The EVSE kit of claim 9, wherein reducing the duty cycle is performed by reducing the control pilot pulse duty cycle by a factor F, so that the duty cycle is changed from the current duty cycle D by multiplying D by (1-F), wherein F depends upon the present temperature.

14. The EVSE kit of claim 13, wherein F is the sample of the present temperature less the predetermined threshold temperature, divided by, the maximum operating temperature less the predetermined threshold temperature.

15. A method for an electric vehicle supply equipment (EVSE) controller in an EVSE kit for charging an electric vehicle through a charging port of the electric vehicle, the method comprising:
a) performing a handshake with the electric vehicle using a prescribed handshake protocol via a control pilot conductor after a docking connector has been inserted into the charging port of the EV;
b) setting the duty cycle of the control pilot generator to a predetermined maximum allowable current draw;
c) comparing a sample of a present temperature inside the EVSE to a predetermined threshold temperature;
d) allowing the predetermined maximum allowable current draw if the sample of the present temperature inside the EVSE is below the predetermined threshold temperature;
e) comparing the sample of the present temperature inside the EVSE with a maximum allowable operating temperature;
f) reducing the duty cycle by a factor proportional to at least one of: (1) either the ratio between the sample of the present temperature and the maximum allowable operating temperature; or (2) the difference between the sample of the present temperature and the maximum allowable operating temperature if the sample of the present temperature is less than the maximum operating temperature; and
g) halting charging if the sample of the measured temperature exceeds the maximum operating temperature.

16. The method of claim 15, wherein the predetermined threshold temperature is 70 degrees C. and the maximum operating temperature is 85 degrees C.

17. The method of claim 16, wherein reducing the duty cycle is performed by reducing the control pilot pulse duty cycle by a factor F, so that the duty cycle is changed from a current duty cycle D, by multiplying D by (1-F), wherein F depends upon the present temperature.

18. The method of claim 17, wherein F is the sample of the present temperature less the predetermined threshold temperature, divided by, the maximum operating temperature less the predetermined threshold temperature.

19. The method of claim 15, wherein reducing the duty cycle is performed by reducing the control pilot pulse duty cycle by a factor F, so that the duty cycle is changed from a current duty cycle D, by multiplying D by (1-F), wherein F depends upon the present temperature.

20. The method of claim 19, wherein F is the sample of the present temperature less the predetermined threshold temperature, divided by, the maximum operating temperature less the predetermined threshold temperature.

* * * * *